(12) United States Patent
Lawrence et al.

(10) Patent No.: US 12,046,986 B2
(45) Date of Patent: Jul. 23, 2024

(54) LOAD REGULATION OF A POWER CONVERTER BASED ON ADJUSTABLE OUTPUT VOLTAGE THRESHOLDS

(71) Applicant: Cirrus Logic International Semiconductor Ltd., Edinburgh (GB)

(72) Inventors: Jason W. Lawrence, Austin, TX (US); Graeme G. Mackay, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 0 days.

(21) Appl. No.: 17/119,571

(22) Filed: Dec. 11, 2020

(65) Prior Publication Data

US 2021/0367514 A1 Nov. 25, 2021

Related U.S. Application Data

(60) Provisional application No. 63/027,555, filed on May 20, 2020, provisional application No. 63/027,586, filed on May 20, 2020, provisional application No. 63/027,596, filed on May 20, 2020, provisional application No. 63/027,547, filed on May 20, 2020, provisional application No. 63/027,533, filed on May 20, 2020.

(51) Int. Cl.
| | |
|---|---|
| *H02M 3/156* | (2006.01) |
| *H02M 1/00* | (2006.01) |
| *H02M 3/158* | (2006.01) |
| *H02M 1/15* | (2006.01) |
| *H02M 3/04* | (2006.01) |
| *H02M 3/157* | (2006.01) |

(52) U.S. Cl.
CPC ....... *H02M 1/0025* (2021.05); *H02M 3/1566* (2021.05); *H02M 3/1584* (2013.01); *H02M 3/1586* (2021.05); *H02M 1/00* (2013.01); *H02M 1/0009* (2021.05); *H02M 1/15* (2013.01); *H02M 3/04* (2013.01); *H02M 3/157* (2013.01); *H02M 3/1582* (2013.01)

(58) Field of Classification Search
CPC .................. H02M 3/155–1588; H02M 1/0025
See application file for complete search history.

(56) References Cited

U.S. PATENT DOCUMENTS

| | | | |
|---|---|---|---|
| 5,248,524 A | 9/1993 | Soderlund | |
| 5,617,016 A | 4/1997 | Borghi et al. | |

(Continued)

FOREIGN PATENT DOCUMENTS

| | | |
|---|---|---|
| CN | 110784140 A | 2/2020 |
| EP | 1919058 A2 | 5/2008 |

(Continued)

OTHER PUBLICATIONS

Machien translation of Korean Patent 20210083718 A by Park et al. (Year: 2021).*

(Continued)

*Primary Examiner* — Peter M Novak
(74) *Attorney, Agent, or Firm* — Jackson Walker L.L.P.

(57) ABSTRACT

A system may include a power converter configured to receive an input voltage and generate an output voltage and a controller configured to control operation of the power converter based on a comparison of the output voltage with at least one output voltage threshold and set the at least one output voltage threshold based on the input voltage.

20 Claims, 29 Drawing Sheets

(56) References Cited

U.S. PATENT DOCUMENTS

| | | | |
|---|---|---|---|
| 5,757,167 | A | 5/1998 | Arora et al. |
| 6,069,780 | A * | 5/2000 | Del Vecchio ........ H02H 3/0935 |
| | | | 361/93.1 |
| 6,177,783 | B1 | 6/2001 | Donohue |
| 6,597,158 | B2 | 7/2003 | Umeda |
| 6,984,970 | B2 * | 1/2006 | Capel .................. G05F 1/67 |
| | | | 323/299 |
| 7,019,503 | B1 | 3/2006 | Ortiz et al. |
| 7,102,340 | B1 | 9/2006 | Ferguson |
| 7,190,150 | B2 | 3/2007 | Chen et al. |
| 7,906,939 | B2 | 3/2011 | Kung et al. |
| 8,330,439 | B2 | 12/2012 | Wu |
| 9,088,247 | B2 | 7/2015 | Arno et al. |
| 9,577,587 | B2 | 2/2017 | Maru et al. |
| 9,639,102 | B2 | 5/2017 | Dally |
| 9,742,393 | B2 | 8/2017 | Pavao-Moreira et al. |
| 9,837,906 | B1 | 12/2017 | Childs et al. |
| 10,116,200 | B1 * | 10/2018 | Kato .................... H02M 3/156 |
| 10,122,265 | B1 | 11/2018 | Matthew et al. |
| 10,222,814 | B1 | 3/2019 | Chakraborty et al. |
| 10,263,523 | B1 | 4/2019 | Sonntag et al. |
| 10,461,639 | B1 | 10/2019 | Childs |
| 10,476,392 | B1 | 11/2019 | Matsuura et al. |
| 10,673,423 | B2 | 6/2020 | Forghani-Zadeh et al. |
| 10,720,835 | B2 | 7/2020 | King et al. |
| 10,734,885 | B2 | 8/2020 | King et al. |
| 10,784,783 | B1 | 9/2020 | Harshey et al. |
| 11,342,846 | B2 | 5/2022 | Bayer et al. |
| 2001/0020802 | A1 | 9/2001 | Kitagawa et al. |
| 2005/0264268 | A1 | 12/2005 | Ueno |
| 2006/0139819 | A1 | 6/2006 | May |
| 2008/0129219 | A1 | 6/2008 | Smith et al. |
| 2008/0278136 | A1 | 11/2008 | Murtojarvi |
| 2009/0266397 | A1 | 10/2009 | Gibson et al. |
| 2010/0019702 | A1 | 1/2010 | Jang et al. |
| 2010/0156175 | A1 | 6/2010 | Wei |
| 2011/0057632 | A1 | 3/2011 | Cheng et al. |
| 2011/0075446 | A1 | 3/2011 | Doutreloigne et al. |
| 2011/0121653 | A1 | 5/2011 | Hartular et al. |
| 2011/0169327 | A1 | 7/2011 | Bonnet et al. |
| 2012/0146605 | A1 * | 6/2012 | Oyama ................. H02M 3/156 |
| | | | 323/282 |
| 2012/0205974 | A1 | 8/2012 | McCaslin et al. |
| 2012/0268094 | A1 | 10/2012 | Scaldaferri et al. |
| 2013/0106188 | A1 | 5/2013 | Ishibashi et al. |
| 2014/0197814 | A1 | 7/2014 | Shi et al. |
| 2014/0361730 | A1 | 12/2014 | Kung |
| 2015/0311789 | A1 | 10/2015 | Larsson et al. |
| 2016/0064986 | A1 | 3/2016 | Langlinais et al. |
| 2016/0065062 | A1 | 3/2016 | Teh et al. |
| 2016/0268889 | A1 | 9/2016 | Henzler et al. |
| 2017/0005567 | A1 | 1/2017 | Mellteg et al. |
| 2017/0005647 | A1 | 1/2017 | Pan et al. |
| 2017/0072812 | A1 | 3/2017 | Von Novak et al. |
| 2017/0179822 | A1 | 6/2017 | Kobayashi et al. |
| 2017/0279344 | A1 | 9/2017 | Lee |
| 2017/0302166 | A1 | 10/2017 | Chen et al. |
| 2017/0373594 | A1 | 12/2017 | Childs |
| 2018/0175734 | A1 | 6/2018 | Gherghescu et al. |
| 2018/0248525 | A1 * | 8/2018 | Orr ........................ G05F 1/575 |
| 2019/0181754 | A1 | 6/2019 | Ash et al. |
| 2019/0229622 | A1 | 7/2019 | Couleur et al. |
| 2019/0245444 | A1 | 8/2019 | Kimura |
| 2020/0235712 | A1 | 7/2020 | May et al. |
| 2021/0083578 | A1 | 3/2021 | King et al. |
| 2021/0126539 | A1 | 4/2021 | Couleur et al. |
| 2021/0159798 | A1 | 5/2021 | Mackay et al. |
| 2021/0364560 | A1 | 11/2021 | Holland et al. |
| 2021/0367510 | A1 | 11/2021 | Lawrence et al. |
| 2021/0367513 | A1 | 11/2021 | Mackay et al. |
| 2021/0367514 | A1 | 11/2021 | Lawrence et al. |
| 2021/0367515 | A1 | 11/2021 | Mackay et al. |
| 2021/0367517 | A1 | 11/2021 | Lawrence et al. |

FOREIGN PATENT DOCUMENTS

| | | | | |
|---|---|---|---|---|
| EP | 2775599 | A1 | 9/2014 | |
| EP | 3214746 | A1 | 9/2017 | |
| EP | 3240171 | A1 | 11/2017 | |
| FR | 2851091 | A1 | 8/2004 | |
| GB | 2555902 | A | 5/2018 | |
| KR | 20210083718 | A * | 7/2021 | .......... F02N 11/0814 |
| TW | 201228201 | A | 7/2012 | |
| WO | 2012135778 | A1 | 10/2012 | |
| WO | 2017027393 | A1 | 2/2017 | |
| WO | 2019135820 | A1 | 7/2019 | |

OTHER PUBLICATIONS

Stmicroelectronics NV, AN4218—Hardware design guideline power supply and voltage measurement—Application Note, Doc ID 024014 Rev 3, 26 pages, Oct. 2015.

Freescale Semiconductor, Inc., Multimedia Applications Division, i.MX233 Power Management Unit and Battery Charger—Application Note, Document No. AN3883, Rev. 0, 36 pages, Jul. 2009.

Texas Instruments, TPS6128x Low-, Wide-Voltage Battery Front-End DC/DC Converter Single-Cell Li-Ion, Ni-Rich, Si-Anode Applications—Data sheet, SLVSBI1A, 57 pages, Oct. 2013, Revised Sep. 2014.

Texas Instruments, Designing Robust TPS65217 Systems for VIN Brownout—Application Report, 13 pages, Oct. 2017.

Renesas Electronics Corporation, Preventing Subsystem Brownouts in Mobile Devices—White Paper, 6 pages.

MFJ Enterprises, Inc., MFJ—Super Battery Booster—Model MFJ-4416C—Instruction Manual, Version 0A, 16 pages, 2017.

International Search Report and Written Opinion of the International Searching Authority, International Application No. PCT/US2020/047237, mailed Oct. 30, 2020.

Stala, Robert et al., "A Switched-Capacitor DC-DC Converter with Variable No. of Voltage Gains and Fault-Tolerant Operation", IEEE Transactions on Industrial Electronics, IEEE Service Center, Piscataway, NJ, US, vol. 66, No. 5, May 1, 2019.

International Search Report and Written Opinion of the International Searching Authority, International Application No. PCT/US2020/056782, mailed Mar. 4, 2021.

Van Vroonhoven, Caspar, A 0-to-60V-Input Vcm Coulomb Counter with Signal-Dependent Supply Current and ±0.5% Gain Inaccuracy from -50° C. to 125° C., 2020 IEEE International Solid-State Circuits Conference, Feb. 19, 2020.

International Search Report and Written Opinion of the International Searching Authority, International Application No. PCT/US2021/039356, mailed Oct. 1, 2021.

International Search Report and Written Opinion of the International Searching Authority, International Application No. PCT/US2021/039373, mailed Sep. 22, 2021.

Yu, Yangwei: "Choosing the Boost with Bypass or Pass Through", Jun. 30, 2017, Retrieved from the Internet Sep. 10, 2021.

Texas Instruments: TPS61291 Loe IQ Boost Converter with Bypass Operation, Sep. 30, 2014, Retrieved from the Internet Sep. 10, 2021.

International Search Report and Written Opinion of the International Searching Authority, International Application No. PCT/US2020/039509, mailed Oct. 8, 2021.

International Search Report and Written Opinion of the International Searching Authority, International Application No. PCT/US2020/041535, mailed Oct. 14, 2021.

Search Report under Section 17, UKIPO, Application No. GB2106142.9, mailed Oct. 20, 2021.

Combined Search and Examination Report under Sections 17 and 18(3), UKIPO, Application No. GB2106144.5, mailed Oct. 25, 2021.

International Search Report and Written Opinion of the International Searching Authority, International Application No. PCT/US2021/041547, mailed Nov. 2, 2021.

International Search Report and Written Opinion of the International Searching Authority, International Application No. PCT/US2021/041918, mailed Nov. 10, 2021.

(56) References Cited

OTHER PUBLICATIONS

International Search Report and Written Opinion of the International Searching Authority, International Application No. PCT/US2021/041544, mailed Nov. 10, 2021.
International Search Report and Written Opinion of the International Searching Authority, International Application No. PCT/US2021/029631, mailed Jul. 23, 2021.
Qiu et al., "Digital Average Current-Mode Control of PWM DC-DC Converts without Current Sensors", IEEE Transactions on Industrial Electronics, IEEE Service Center, vol. 57, No. 5, May 10, 2010, Piscataway, NJ, USA.
International Search Report and Written Opinion of the International Searching Authority, International Application No. PCT/US2021/029584, mailed Jul. 30, 2021.
International Search Report and Written Opinion of the International Searching Authority, International Application No. PCT/US2021/032474, mailed Aug. 3, 2021.
Vinnikov et al., "Solar Optiverter-A Novel Hybrid Approach to the PHotovoltaic Module Level Power Electronics", IEEE Transactions on Industrial Electronics, IEEE Service Center, vol. 66, No. 5, May 1, 2019, pp. 3869-3880, Piscataway, NJ, USA.
International Search Report and Written Opinion of the International Searching Authority, International Application No. PCT/US2021/032496, mailed Aug. 4, 2021.
International Search Report and Written Opinion of the International Searching Authority, International Application No. PCT/US2021/030932, mailed Aug. 20, 2021.
Combined Search and Examination Report, United Kingdom Intellectual Property Office, Application No. GB2205160.1, mailed Jul. 29, 2022.

\* cited by examiner

LOAD REGULATION OF A POWER CONVERTER BASED ON ADJUSTABLE OUTPUT VOLTAGE THRESHOLDS

RELATED APPLICATION

The present disclosure claims priority to U.S. Provisional Patent Application Ser. No. 63/027,596 filed May 20, 2020, U.S. Provisional Patent Application Ser. No. 63/027,555 filed May 20, 2020, U.S. Provisional Patent Application Ser. No. 63/027,586 filed May 20, 2020, U.S. Provisional Patent Application Ser. No. 63/027,533 filed May 20, 2020, and U.S. Provisional Patent Application Ser. No. 63/027,547 filed May 20, 2020, all of which are incorporated by reference herein in their entireties.

FIELD OF DISCLOSURE

The present disclosure relates in general to circuits for electronic devices, including without limitation personal audio devices such as wireless telephones and media players, and more specifically, to load regulation of a power converter based on adjustable output voltage thresholds.

BACKGROUND

Personal audio devices, including wireless telephones, such as mobile/cellular telephones, cordless telephones, mp3 players, and other consumer audio devices, are in widespread use. Such personal audio devices may include circuitry for driving a pair of headphones or one or more speakers. Such circuitry often includes a speaker driver including a power amplifier for driving an audio output signal to headphones or speakers. Oftentimes, a power converter may be used to provide a supply voltage to a power amplifier in order to amplify a signal driven to speakers, headphones, or other transducers. A switching power converter is a type of electronic circuit that converts a source of power from one direct current (DC) voltage level to another DC voltage level. Examples of such switching DC-DC converters include but are not limited to a boost converter, a buck converter, a buck-boost converter, an inverting buck-boost converter, and other types of switching DC-DC converters. Thus, using a power converter, a DC voltage such as that provided by a battery may be converted to another DC voltage used to power the power amplifier.

A power converter may be used to provide supply voltage rails to one or more components in a device. Accordingly, it may be desirable to regulate an output voltage of a power converter with minimal ripple in the presence of a time-varying current and power load.

SUMMARY

In accordance with the teachings of the present disclosure, one or more disadvantages and problems associated with existing approaches to regulating an output voltage of a power converter may be reduced or eliminated.

In accordance with embodiments of the present disclosure, a system for controlling a current in a power converter may include an outer control loop configured to use an outer set of output voltage thresholds for an output voltage generated by the power converter in order to provide hysteretic control of the current, and an inner control loop configured to use an inner set of output voltage thresholds for the output voltage in order to provide continuous control of the current. The inner control loop may further be configured to measure a time duration required for the output voltage to cross a single pair of two output voltage thresholds of the inner set of output voltage thresholds in order to determine an input-referred estimate of a current load of the power converter and set a peak current threshold and a valley current threshold for the current based on the input-referred estimate of the current load.

In accordance with these and other embodiments of the present disclosure, a system may include an inductive power converter configured to receive an input voltage and generate an output voltage and a switch controller for controlling switching of the inductive power converter to define a charging state and a transfer state of the inductive power converter, wherein the switch controller comprises a plurality of comparators, each comparator having a respective reference voltage to which the output voltage is compared, and wherein the plurality of comparators are used for controlling the inductive power converter in one or both of a hysteretic control mode and a continuous control mode.

In accordance with these and other embodiments of the present disclosure, a method for controlling a current in a power converter may include applying an outer control loop configured to use an outer set of output voltage thresholds for an output voltage generated by the power converter in order to provide hysteretic control of the current and applying an inner control loop configured to use an inner set of output voltage thresholds for the output voltage in order to provide continuous control of the current, the inner control loop further configured to measure a time duration required for the output voltage to cross a single pair of two output voltage thresholds of the inner set of output voltage thresholds in order to determine an input-referred estimate of a current load of the power converter and set a peak current threshold and a valley current threshold for the current based on the input-referred estimate of the current load.

In accordance with these and other embodiments of the present disclosure, a method may include controlling switching of an inductive power converter to define a charging state and a transfer state of the inductive power converter, wherein the power converter is configured to receive an input voltage and generate an output voltage and wherein controlling comprises using a plurality of comparators for controlling the inductive power converter in one or both of a hysteretic control mode and a continuous control mode, each comparator having a respective reference voltage to which the output voltage is compared.

In accordance with these and other embodiments of the present disclosure, a system for controlling a current in a power converter configured to generate an output voltage may include a control loop having a plurality of comparators, each comparator having a respective reference voltage to which the output voltage is compared, a digital controller configured to calculate one or more pre-seeded control parameters for the current, and an analog state machine configured to, based on outputs of the plurality of comparators, select control parameters for controlling the current. The control parameters may be selected from the pre-seeded control parameters, control parameters for controlling the current to have a magnitude of zero, and control parameters for controlling the current to have a maximum magnitude.

In accordance with these and other embodiments of the present disclosure, a method for controlling a current in a power converter configured to generate an output voltage may include using a control loop having a plurality of comparators, each comparator having a respective reference voltage to which the output voltage is compared, a digital controller configured to calculate one or more pre-seeded control parameters for the current, and an analog state machine configured to, based on outputs of the plurality of comparators, select control parameters for controlling the current. The control parameters may be selected from the pre-seeded control parameters, control parameters for controlling the current to have a magnitude of zero, and control parameters for controlling the current to have a maximum magnitude.

In accordance with these and other embodiments of the present disclosure, a method of randomizing inductor current in at least one of a plurality of parallel coupled peak/valley current-controlled power converters may include comparing the inductor current to a threshold to generate a comparison signal, delaying the comparison signal by a plurality of delay amounts to generate a plurality of delayed versions of the comparison signal, and randomly selecting one of the plurality of delayed versions of the comparison signal for controlling the inductor current during one or both of a charging state and a transfer state of the at least one of the plurality of parallel coupled peak/valley current-controlled power converters.

In accordance with these and other embodiments of the present disclosure, a method of randomizing inductor current in at least one of a plurality of parallel coupled peak/valley current-controlled power converters may include randomly selecting an offset current parameter, adding the offset current parameter to a reference current parameter to generate a modified reference current parameter, and comparing the inductor current to the modified reference current parameter to control the inductor current during one or both of a charging state and a transfer state of the at least one of the plurality of parallel coupled peak/valley current-controlled power converters.

In accordance with these and other embodiments of the present disclosure, a system of randomizing inductor current in at least one of a plurality of parallel coupled peak/valley current-controlled power converters may include a comparator configured to compare the inductor current to a threshold to generate a comparison signal, delay elements configured to delay the comparison signal by a plurality of delay amounts to generate a plurality of delayed versions of the comparison signal, and selection logic configured to randomly select one of the plurality of delayed versions of the comparison signal for controlling the inductor current during one or both of a charging state and a transfer state of the at least one of the plurality of parallel coupled peak/valley current-controlled power converters.

In accordance with these and other embodiments of the present disclosure, a system of randomizing inductor current in at least one of a plurality of parallel coupled peak/valley current-controlled power converters may include selection logic configured to randomly selecting an offset current parameter, a combiner configured to add the offset current parameter to a reference current parameter to generate a modified reference current parameter, and a comparator configured to compare the inductor current to the modified reference current parameter to control the inductor current during one or both of a charging state and a transfer state of the at least one of the plurality of parallel coupled peak/valley current-controlled power converters.

In accordance with these and other embodiments of the present disclosure, a system may include a power converter configured to receive an input voltage and generate an output voltage and a controller configured to control operation of the power converter based on a comparison of the output voltage with at least one output voltage threshold and set the at least one output voltage threshold based on the input voltage.

In accordance with these and other embodiments of the present disclosure, a method may include controlling operation of a power converter configured to receive an input voltage and generate an output voltage, such controlling based on a comparison of the output voltage with at least one output voltage threshold and setting the at least one output voltage threshold based on the input voltage.

In accordance with these and other embodiments of the present disclosure, a system may include a power converter configured to receive an input voltage and generate an output voltage and a controller configured to control operation of the power converter based on a comparison of a current associated with the power converter to a threshold current and control the threshold current as a function of the input voltage.

In accordance with these and other embodiments of the present disclosure, a method may include controlling operation of a power converter configured to receive an input voltage and generate an output voltage, such controlling based on a comparison of a current associated with the power converter to a threshold current and controlling the threshold current as a function of the input voltage.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
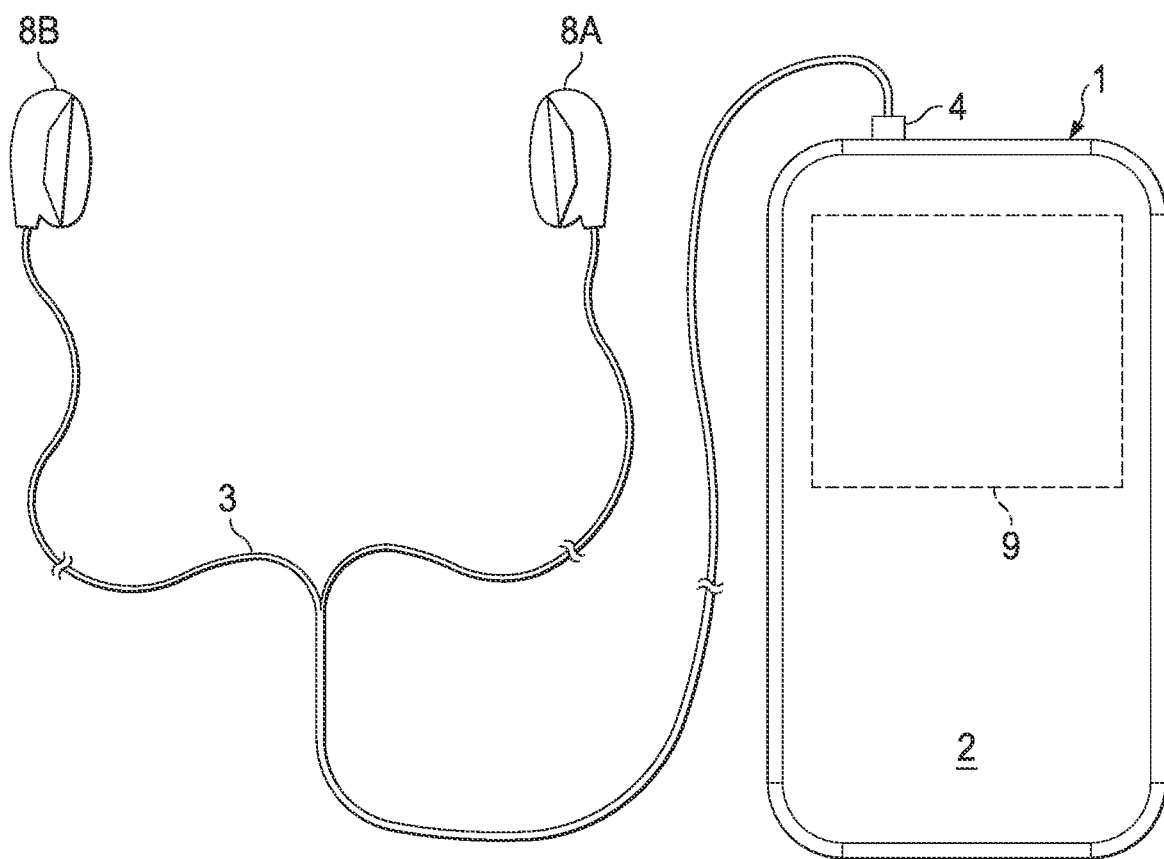
FIG. 1 illustrates an example mobile device, in accordance with embodiments of the present disclosure.

FIG. 1 illustrates an example mobile device 1, in accordance with embodiments of the present disclosure. FIG. 1 depicts mobile device 1 coupled to a headset 3 in the form of a pair of earbud speakers 8A and 8B. Headset 3 depicted in FIG. 1 is merely an example, and it is understood that mobile device 1 may be used in connection with a variety of audio transducers, including without limitation, headphones, earbuds, in-ear earphones, and external speakers. A plug 4 may provide for connection of headset 3 to an electrical terminal of mobile device 1. Mobile device 1 may provide a display to a user and receive user input using a touch screen 2, or alternatively, a standard liquid crystal display (LCD) may be combined with various buttons, sliders, and/or dials disposed on the face and/or sides of mobile device 1.

Figure 2:
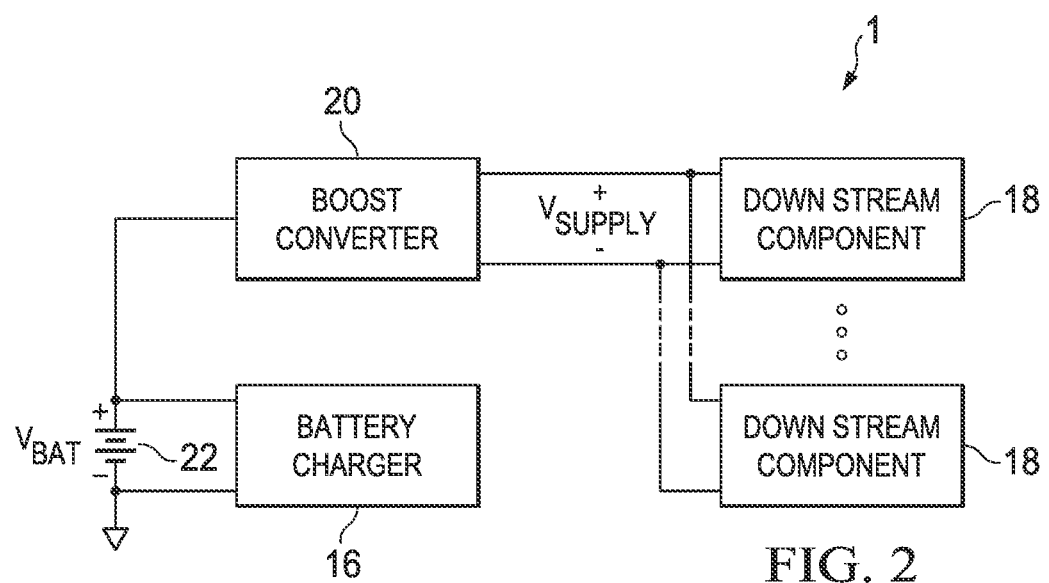
FIG. 2 illustrates a block diagram of selected components internal to a mobile device, in accordance with embodiments of the present disclosure.

FIG. 2 illustrates a block diagram of selected components integral to mobile device 1, in accordance with embodiments of the present disclosure. As shown in FIG. 2, mobile device 1 may include a boost converter 20 configured to boost a battery voltage $V_{BAT}$ to generate a supply voltage $V_{SUPPLY}$ to a plurality of down stream components 18 of mobile device 1. Downstream components 18 of mobile device 1 may include any suitable functional circuits or devices of mobile device 1, including without limitation processors, audio coder/decoders, amplifiers, display devices, etc. As shown in FIG. 2, mobile device 1 may also include a battery charger 16 for recharging battery 22.

In some embodiments of mobile device 1, boost converter 20 and battery charger 16 may comprise the only components of mobile device 1 electrically coupled to battery 22, and boost converter 20 may electrically interface between battery 22 and all downstream components of mobile device 1. However, in other embodiments of mobile device 1, some downstream components 18 may electrically couple directly to battery 22.

Figure 3A:
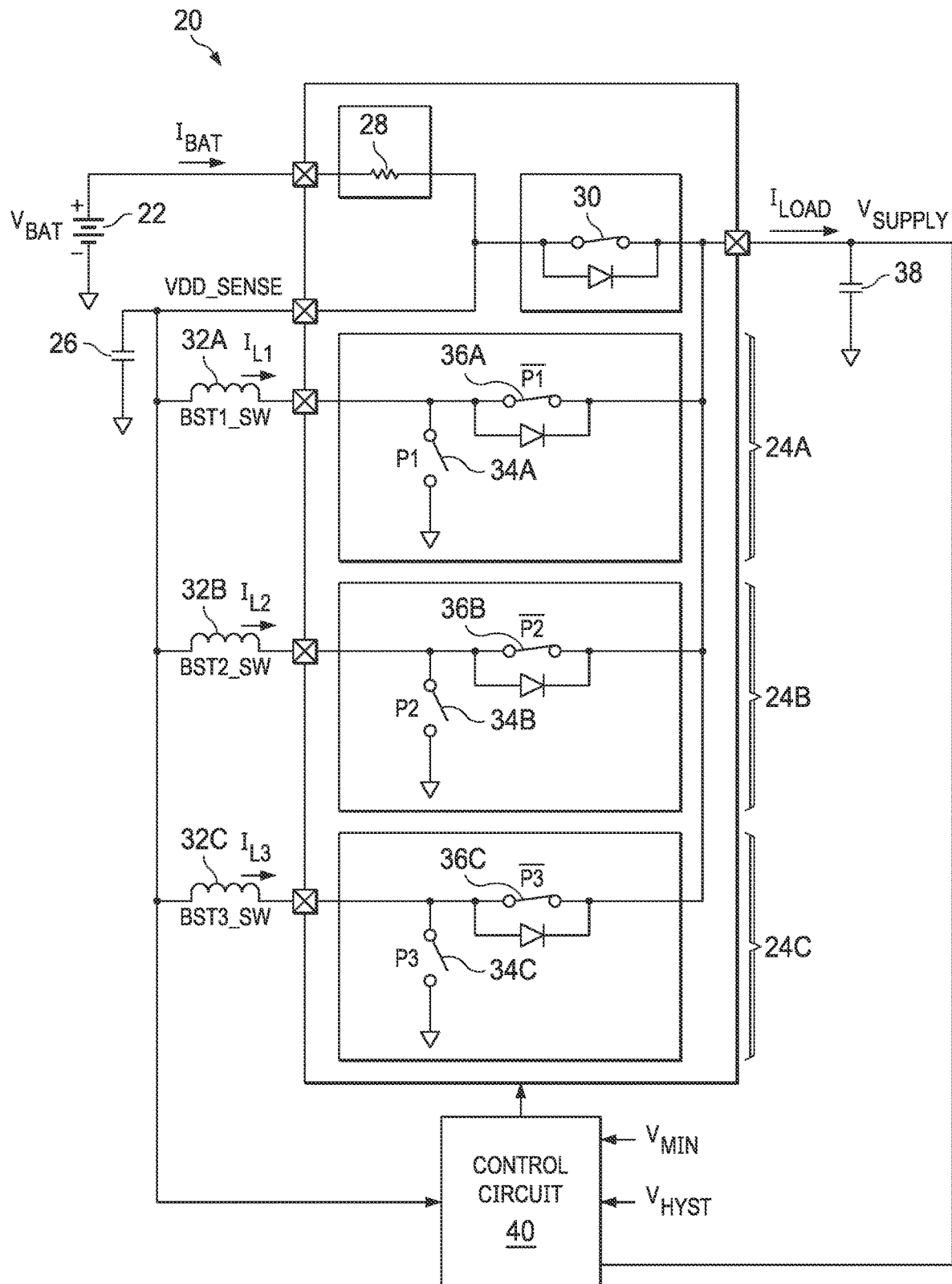
FIG. 3A illustrates a block diagram of selected components of an example boost converter with multiple modes of operation depicting operation in a bypass mode, in accordance with embodiments of the present disclosure.

FIG. 3A illustrates a block diagram of selected components of an example boost converter 20 with multiple modes of operation depicting operation in a bypass mode, in accordance with embodiments of the present disclosure. As shown in FIG. 3A, boost converter 20 may include a battery 22, a plurality of inductive boost phases 24, a sense capacitor 26, a sense resistor 28, a bypass switch 30, and a control circuit 40. As shown in FIG. 3A, each inductive boost phase 24 may include a power inductor 32, a charge switch 34 a rectification switch 36, and output capacitor 38.

Figure 3B:
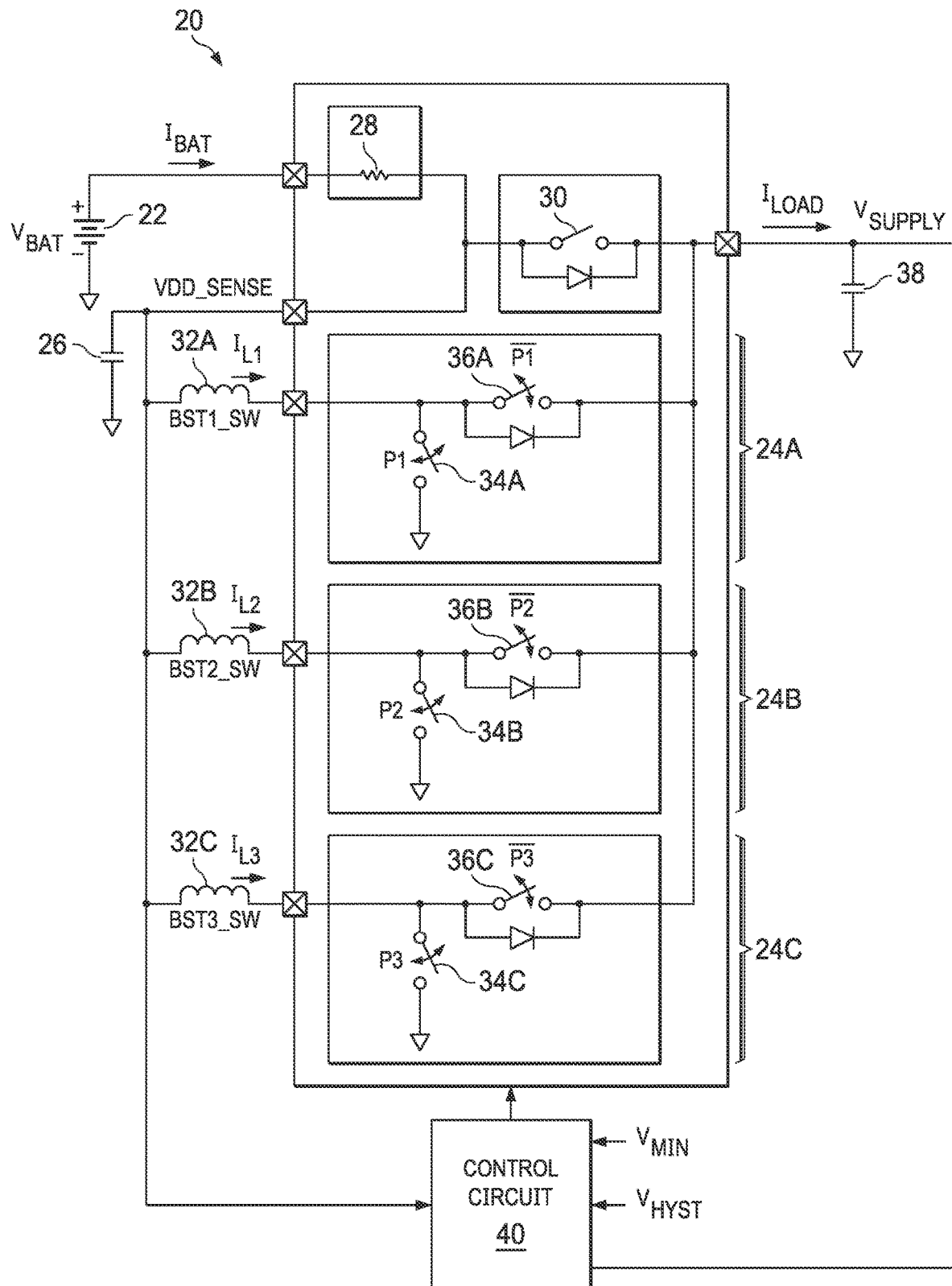
FIG. 3B illustrates a block diagram of selected components of an example boost converter with multiple modes of operation depicting operation in a boost active mode, in accordance with embodiments of the present disclosure.
Figure 3C:
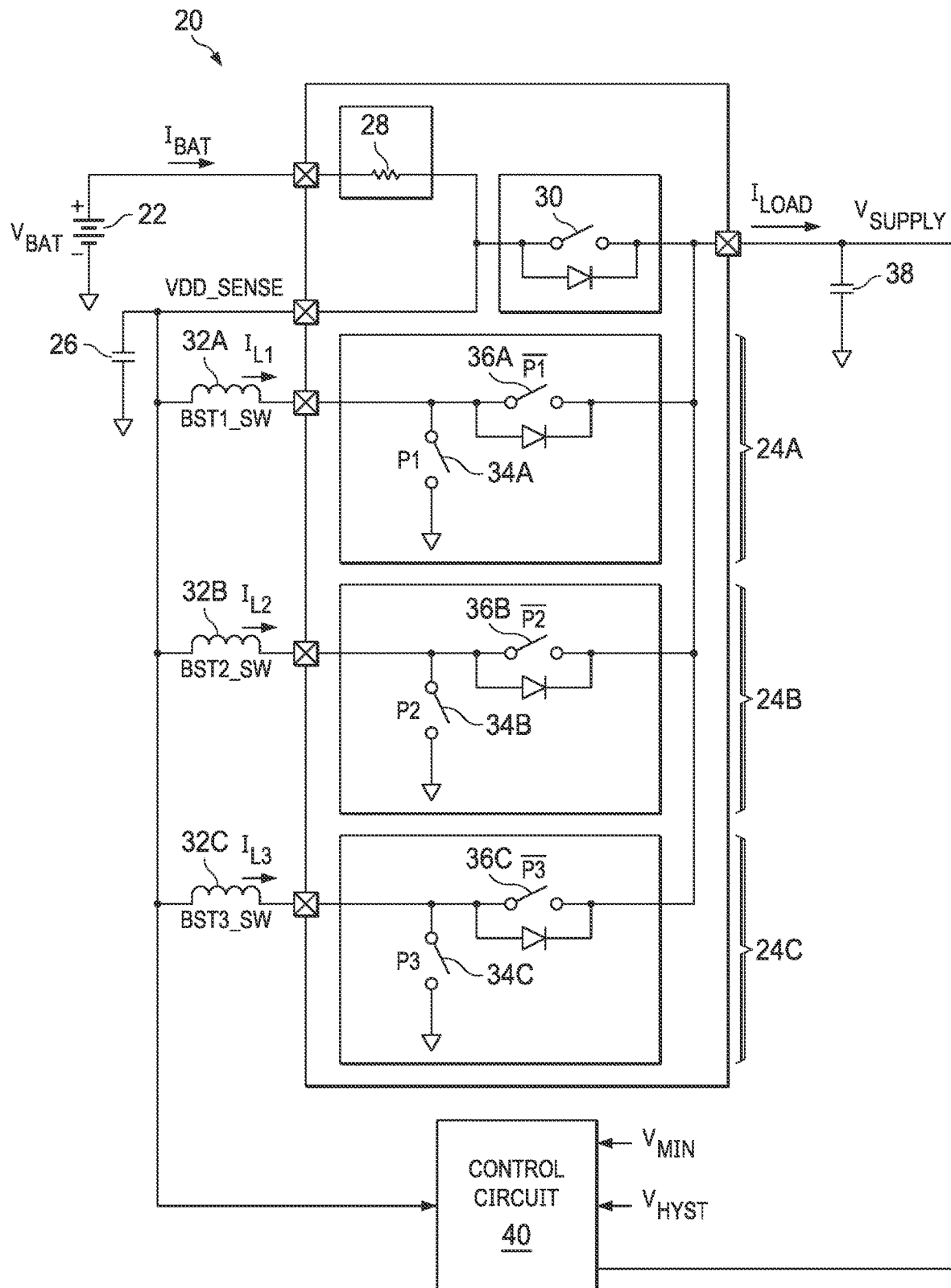
FIG. 3C illustrates a block diagram of selected components of an example boost converter with multiple modes of operation depicting operation in a boost inactive mode, in accordance with embodiments of the present disclosure.

Although FIGS. 3A-3C depict boost converter 20 having three inductive boost phases 24, embodiments of boost converter 20 may have any suitable number of inductive boost phases 24. In some embodiments, boost converter 20 may comprise three or more inductive boost phases 24. In other embodiments, boost converter 20 may comprise fewer than three phases (e.g., a single phase or two phases).

Boost converter 20 may operate in the bypass mode when supply voltage $V_{SUPPLY}$ generated by boost converter 20 is greater than a threshold minimum voltage $V_{MIN}$. In some embodiments, such threshold minimum voltage $V_{MIN}$ may be a function of a monitored current (e.g., a current through sense resistor 28). In some embodiments, such threshold minimum voltage $V_{MIN}$ may be varied in accordance with variations in the monitored current, in order to provide desired headroom from components supplied from supply voltage $V_{SUPPLY}$. Control circuit 40 may be configured to sense supply voltage $V_{SUPPLY}$ and compare supply voltage $V_{SUPPLY}$ to threshold minimum voltage $V_{MIN}$. In the event that supply voltage $V_{SUPPLY}$ and voltage VDD_SENSE across sense capacitor 26 are greater than threshold minimum voltage $V_{MIN}$, control circuit 40 may activate (e.g., enable, close, turn on) bypass switch 30 and one or more rectification switches 36 and deactivate (e.g., disable, open, turn off) charge switches 34. In such bypass mode, the resistances of rectification switches 36, power inductors 32, and bypass switch 30 may combine to minimize a total effective resistance of a path between battery 22 and supply voltage $V_{SUPPLY}$.

FIG. 3B illustrates a block diagram of selected components of example boost converter 20 depicting operation in a boost active mode, in accordance with embodiments of the present disclosure. Boost converter 20 may operate in the boost active mode when supply voltage $V_{SUPPLY}$ is insufficient to maintain supply voltage $V_{SUPPLY}$ above threshold minimum voltage $V_{MIN}$. In the boost active mode, control circuit 40 may deactivate (e.g., disable, open, turn off) bypass switch 30, and periodically commutate charge switches 34 (e.g., during a charging state of a phase 24) and rectification switches 36 (e.g., during a transfer state of a phase 24) of inductive boost phase 24 (as described in greater detail below) by generating appropriate control signals $P_1$, $P_1^-$, $P_2$, $P_2^-$, $P_3$, and $P_3^-$, to deliver a current $I_{BAT}$ and boost battery voltage $V_{BAT}$ to a higher supply voltage $V_{SUPPLY}$ in order to provide a programmed (or servoed) desired current (e.g., average current) to the electrical node of supply voltage $V_{SUPPLY}$, while maintaining supply voltage $V_{SUPPLY}$ above threshold minimum voltage $V_{MIN}$. In the boost active mode, voltage VDD_SENSE may fall below threshold minimum voltage $V_{MIN}$. Further, in the boost active mode, boost converter 20 may operate as a single phase boost converter or multi-phase boost converter.

In the boost active mode, control circuit 40 may operate boost converter 20 by operating inductive boost phase 24 in a peak and valley detect operation, as described in greater detail. The resulting switching frequency of charge switches 34 and rectification switches 36 of inductive boost phase 24 may be determined by the sense voltage VDD_SENSE, supply voltage $V_{SUPPLY}$, an inductance of power inductor 32A, and a programmed ripple parameter (e.g., a configuration of a target current ripple in power inductor 32A).

FIG. 3C illustrates a block diagram of selected components of boost converter 20 depicting operation in a boost inactive mode, in accordance with embodiments of the present disclosure. Boost converter 20 may operate in the boost inactive mode when supply voltage $V_{SUPPLY}$ generated by boost converter 20 rises above a sum of threshold minimum voltage $V_{MIN}$ and a hysteresis voltage $V_{HYST}$ and a sense voltage VDD_SENSE remains below threshold minimum voltage $V_{MIN}$. In the boost inactive mode, control circuit 40 may deactivate (e.g., disable, open, turn off) bypass switch 30, charge switches 34, and rectification switches 36. Thus, when sense voltage VDD_SENSE remains below threshold minimum voltage $V_{MIN}$, control circuit 40 prevents boost converter 20 from entering the bypass mode in order to not backpower battery 22 from supply voltage $V_{SUPPLY}$. Further, if supply voltage $V_{SUPPLY}$ should fall below threshold minimum voltage $V_{MIN}$, control circuit 40 may cause boost converter 20 to again enter the boost active mode in order to increase supply voltage $V_{SUPPLY}$ to the sum of threshold minimum voltage $V_{MIN}$ and a hysteresis voltage $V_{HYST}$.

Figure 4:
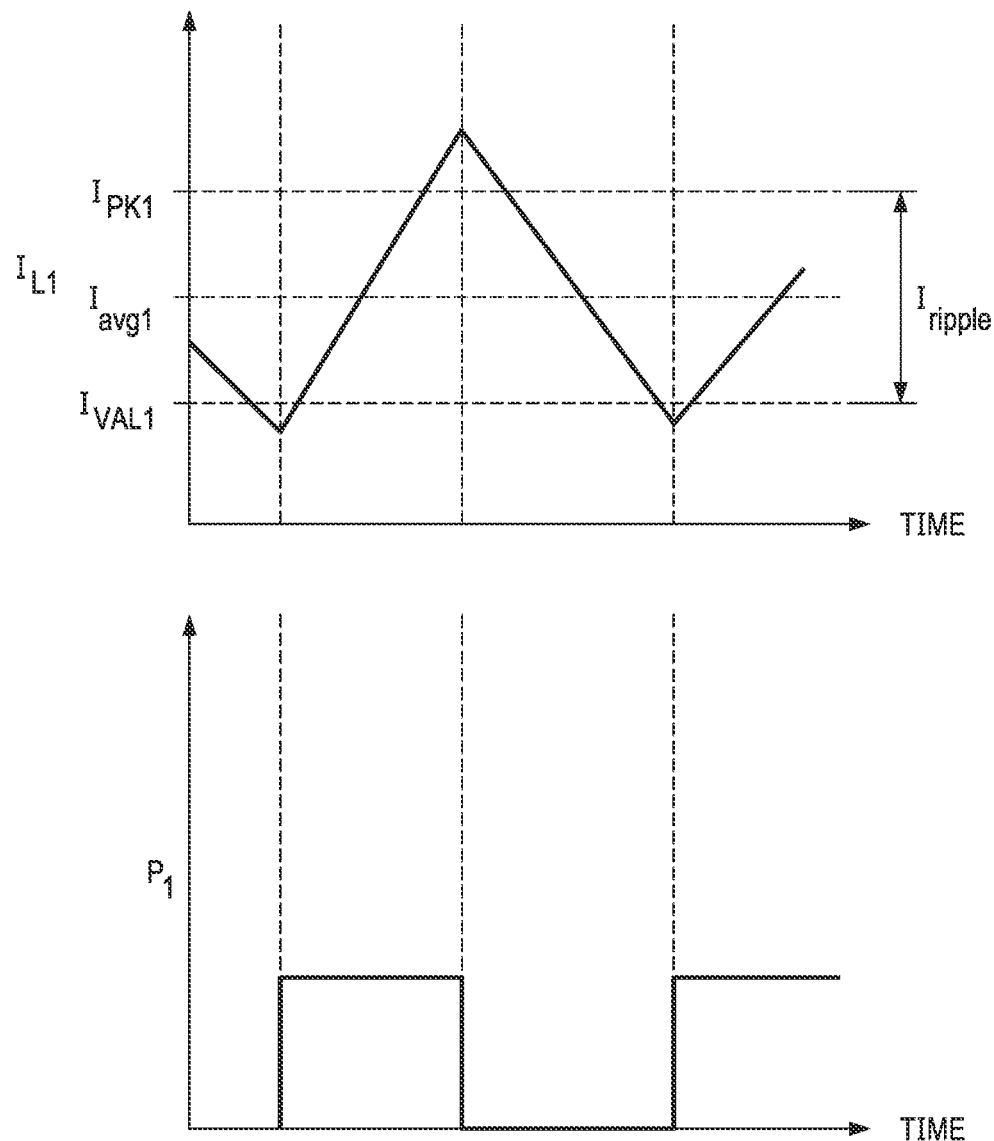
FIG. 4 illustrates a graph of inductor current through a phase of a boost converter and a control signal of switches of the phase versus time, in accordance with embodiments of the present disclosure.

As described above, when boost converter 20 operates in the boost active mode, control circuit 40 may provide hysteretic current control of inductor currents $I_{L1}$, $I_{L2}$, and $I_{L3}$ through power inductors 32A, 32B, and 32C, respectively. FIG. 4 illustrates an example graph of inductor current $I_{L1}$ and control signal $P_1$ versus time, in accordance with embodiments of the present disclosure. As shown in FIG. 4, control circuit 40 may generate control signals $P_1$ and $P_1^-$ of phase 24A such that: (a) when inductor current $I_{L1}$ falls below a valley current threshold $I_{val1}$, control circuit 40 may activate charge switch 34A and deactivate rectification switch 36A; and (b) when inductor current $I_{L1}$ increases above a peak current threshold $I_{pk1}$, control circuit 40 may deactivate charge switch 34A and activate rectification switch 36A. Accordingly, control circuit 40 may provide hysteretic control of inductor current $I_{L1}$ such that inductor current $I_{L1}$ varies between approximately valley current threshold $I_{val1}$ and approximately peak current threshold $I_{pk1}$, with inductor current $I_{L1}$ having an average current $I_{avg1}$ and a ripple current $I_{ripple}$, such that:

$$I_{pk1} = I_{avg1} + \frac{I_{ripple}}{2}; \text{ and}$$

$$I_{val1} = I_{avg1} - \frac{I_{ripple}}{2}.$$

Control circuit 40 may also generate control signals $P_2$, $P_2^-$, $P_3$, and $P_3^-$ of phases 24B and 24C to provide similar or identical control of inductor currents $I_{L2}$ and $I_{L3}$.

Figure 5:
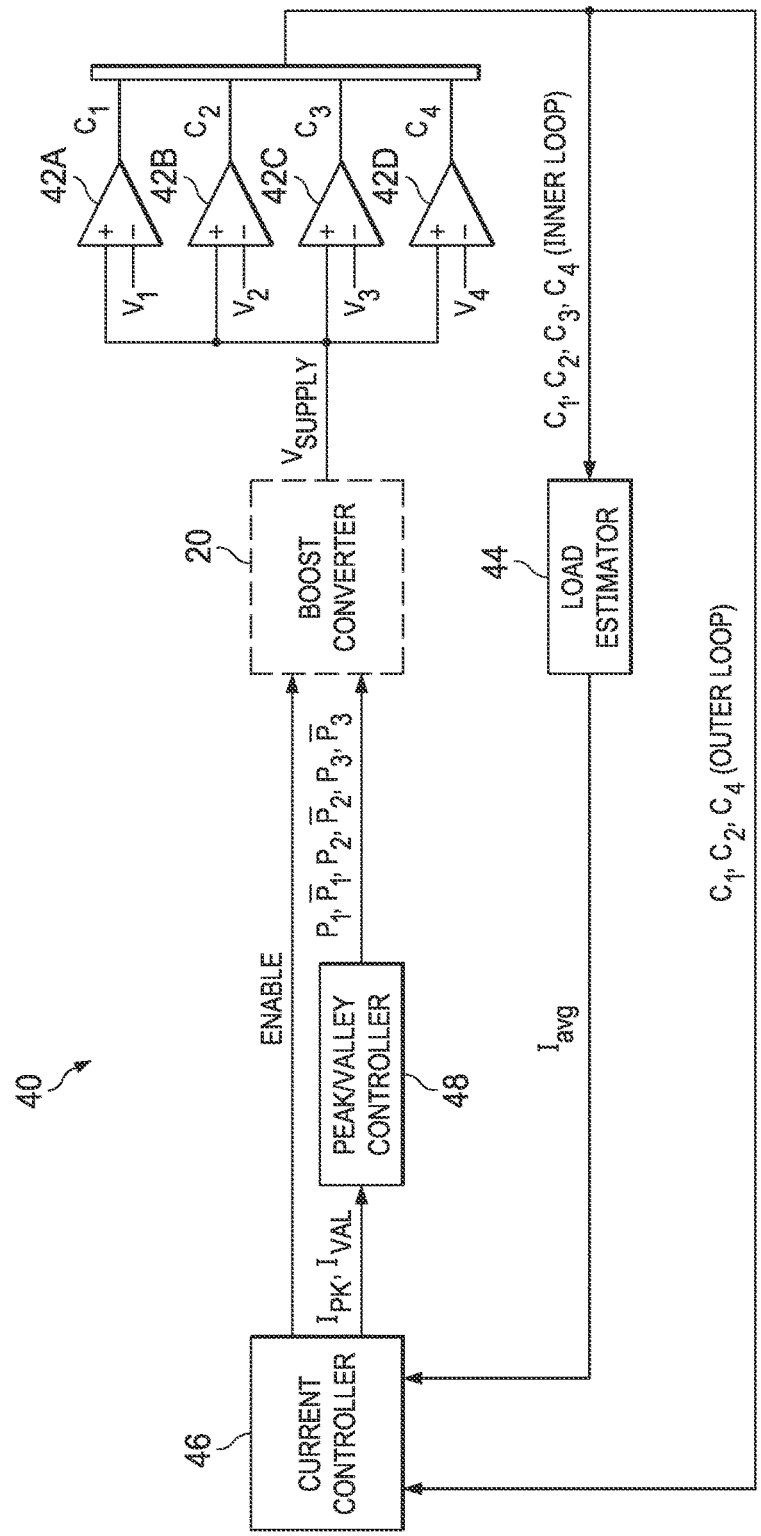
FIG. 5 illustrates a block diagram of selected components of an example control circuit for a boost converter, in accordance with embodiments of the present disclosure.

FIG. 5 illustrates a block diagram of selected components of control circuit 40, in accordance with embodiments of the present disclosure. As shown in FIG. 5, control circuit 40 may comprise a plurality of comparators 42A, 42B, 42C, and 42D, each configured to compare supply voltage $V_{SUPPLY}$ to a respective threshold voltage $V_1$, $V_2$, $V_3$, and $V_4$, and generate respective comparison signals $C_1$, $C_2$, $C_3$, and $C_4$.

Based on comparison signals $C_1$, $C_2$, $C_3$, and $C_4$, a load estimator 44 of control circuit 40 may implement an inner control loop to estimate a load seen at the output of boost converter 20, and based thereon, generate a target average current $I_{avg}$ for battery current $I_{BAT}$. The inner control loop may be said to provide continuous control of inductor current $I_L$. Further, based on comparison signals $C_1$, $C_2$, and $C_4$, and target average current $I_{avg}$, a current controller 46 of control circuit 40 may implement an outer control loop. Both the inner control loop and outer control loop may be used to set valley current threshold $I_{val}$, peak current threshold $I_{pk}$, and a control signal ENABLE for selectively enabling or disabling the boost active mode of boost converter 20. In operation, the inner control loop may maximize efficiency of boost converter 20 and minimize ripple on voltage $V_{SUPPLY}$, while the outer control loop may bound a maximum ripple of supply voltage $V_{SUPPLY}$. Based on valley current threshold $I_{val}$ and peak current threshold $I_{pk}$, a peak/valley controller 48 of control circuit 40 may generate control signals for controlling power converter 20.

Figure 6:
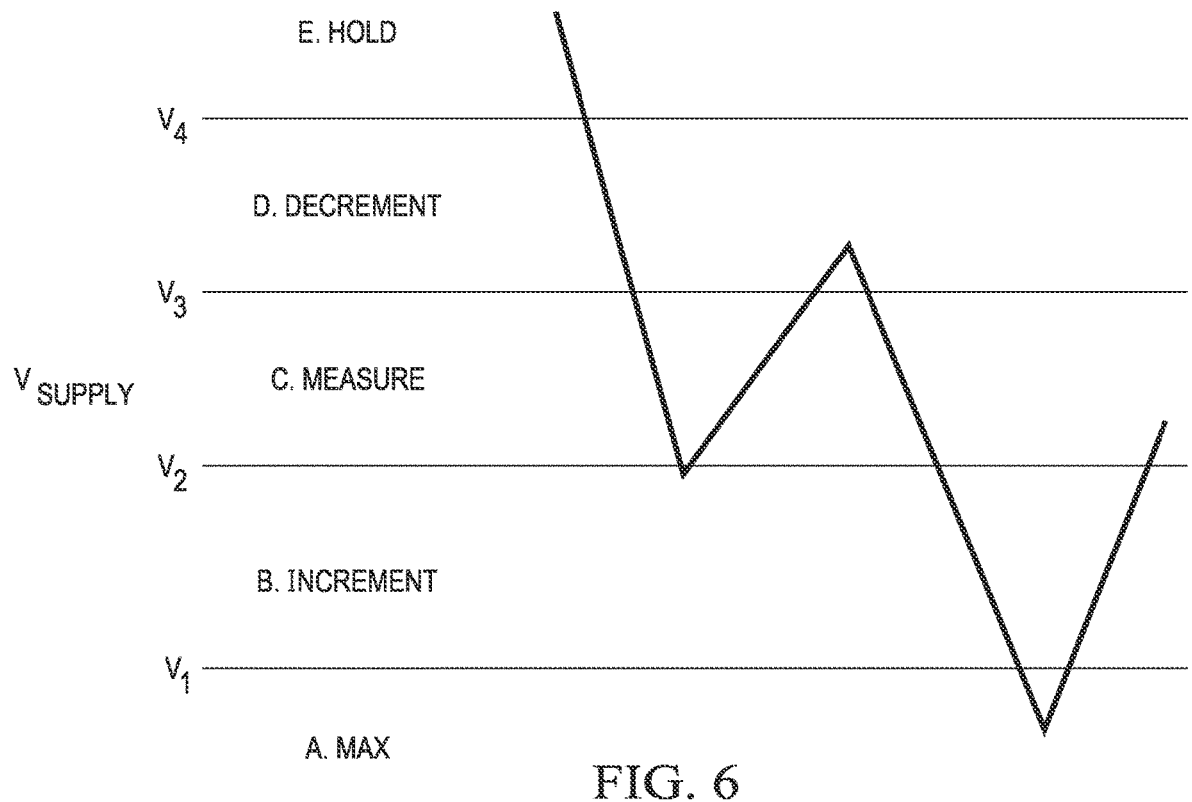
FIG. 6 illustrates an example graph of a supply voltage generated by the boost converter of FIGS. 3A-3C versus time, in accordance with the present disclosure.

FIG. 6 illustrates an example graph of supply voltage $V_{SUPPLY}$ versus time, in accordance with the present disclosure. As shown in FIG. 6, threshold voltages $V_1$, $V_2$, $V_3$, and $V_4$ may divide the magnitude of supply voltage $V_{SUPPLY}$ into five distinct regions A, B, C, D, and E. FIG. 6 demonstrates how load estimator 44 may adjust target average current $I_{avg}$ in each of these five distinct regions A, B, C, D, and E.

Region A may be referred to as the MAX region. Is this region, supply voltage $V_{SUPPLY}$ is below an undervoltage threshold represented by threshold voltage $V_1$. Accordingly, in Region A, load estimator 44 may set target average current $I_{avg}$ to its maximum in order to cause generation of as much inductor current $I_L$ (e.g., $I_{L1}$, $I_{L2}$, $I_{L3}$) as possible in order to minimize droop of supply voltage $V_{SUPPLY}$.

Region B may be referred to as the INCREMENT region. In this region between threshold voltages $V_1$ and $V_2$, load estimator 44 may recursively increment target average current $I_{avg}$ in order to increase current delivered by boost converter 20 in order to increase supply voltage $V_{SUPPLY}$. Load estimator 44 may increment target average current $I_{avg}$ using multiplicative recursion (e.g., $I_{avg(i+1)}=I_{avg(i)} \times a_1$, where $a_1>1$), additive recursion (e.g., $I_{avg(i+1)}=I_{avg(i)}+a_2$, where $a_2>0$), or any other recursive approach.

Region C may be referred to as the MEASURE region, in which $V_{SUPPLY}$ is between threshold voltages $V_2$ and $V_3$. In Region C, load estimator 44 may measure a time in which supply voltage $V_{SUPPLY}$ takes to cross threshold voltages $V_2$ and $V_3$ and may update target average current $I_{avg}$ accordingly, as described in greater detail below.

Region D may be referred to as the DECREMENT region. In this region between threshold voltages $V_3$ and $V_4$, load estimator 44 may recursively decrement target average current $I_{avg}$ in order to decrease current delivered by boost converter 20 in order to decrease supply voltage $V_{SUPPLY}$. Load estimator 44 may decrement target average current $I_{avg}$ using multiplicative recursion (e.g., $I_{avg(i+1)}=I_{avg(i)} \times a_1$, where $a_1<1$), additive recursion (e.g., $I_{avg(i+1)}=I_{avg(i)}+a_2$, where $a_2<0$), or any other recursive approach.

Region E may be referred to as the HOLD region. In this region above threshold voltage $V_4$, load estimator 44 may hold or maintain the value of decrement target average current $I_{avg}$ (e.g., $I_{avg(i+1)}=I_{avg(i)}$).

Figure 7:
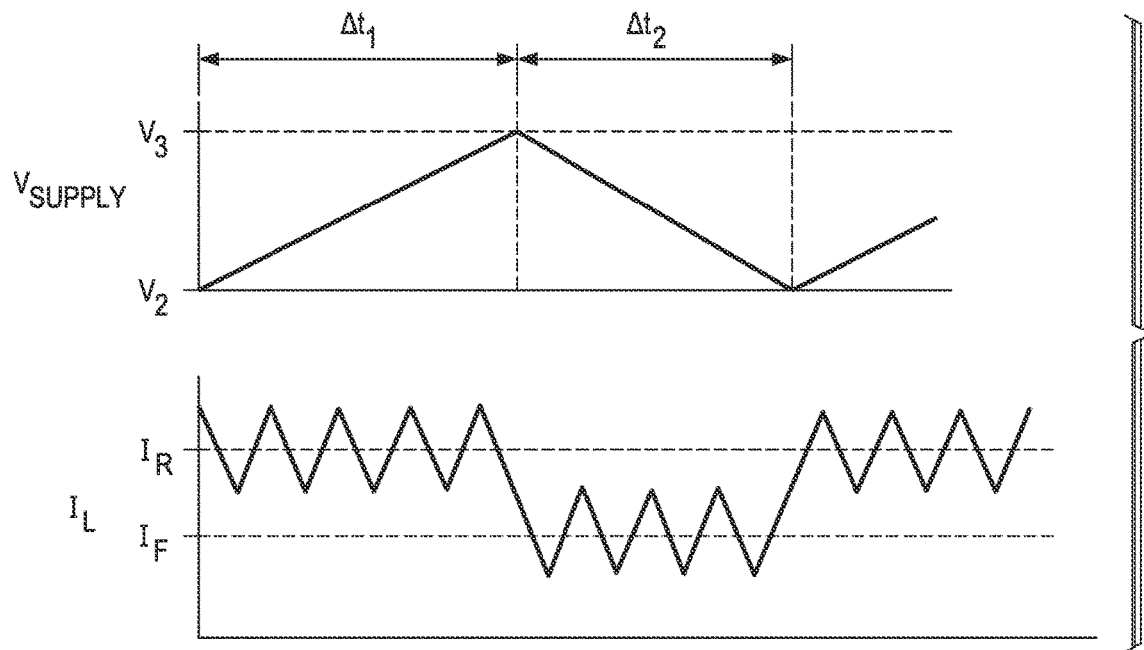
FIG. 7 illustrates a waveform of a supply voltage generated by a power converter over a period of time and a waveform of an inductor current within the power converter over the same period of time, in accordance with the present disclosure.

As discussed above, when in Region C, load estimator 44 measures the time supply voltage $V_{SUPPLY}$ takes to cross threshold voltages $V_2$ and $V_3$, and may use such measurement to update target average current $I_{avg}$. To illustrate, reference is made to FIG. 7 which depicts a waveform of supply voltage $V_{SUPPLY}$ over a period of time and a waveform of an inductor current $I_L$ (e.g., one of inductor currents $I_{L1}$, $I_{L2}$, $I_{L3}$) over the same period of time. As shown in FIG. 7, load estimator 44 may measure a time $\Delta t_1$ it takes supply voltage $V_{SUPPLY}$ to increase from threshold voltage $V_2$ to threshold voltage $V_3$. The change in voltage from threshold voltage $V_2$ to threshold voltage $V_3$ divided by the time $\Delta t_1$ may define a slope $s_1$. Similarly, load estimator 44 may measure a time $\Delta t_2$ it takes supply voltage $V_{SUPPLY}$ to decrease from threshold voltage $V_3$ to threshold voltage $V_2$. The change in voltage from threshold voltage $V_3$ to threshold voltage $V_2$ divided by the time $\Delta t_2$ may define a slope $s_2$. Average inductor current $I_{avg(i)}$ through an individual power inductor 32 during a rising supply voltage $V_{SUPPLY}$ may be defined as a rise current $I_R$, while average inductor current $I_{avg(i)}$ through an individual power inductor 32 during a falling supply voltage $V_{SUPPLY}$ may be defined as a fall current $I_F$.

Using a charge balance relationship for output capacitor 38 coupled to supply voltage $V_{SUPPLY}$, load estimator 44 may update target average current $I_{avg}$ drawn from battery 22. For example, using the measurement for rise current $I_R$, target average current $I_{avg}$ may be updated in accordance with:

$$I_{avg} = I_R - s_1 \cdot \frac{C_{out}}{D_i'}$$

Where $D_i'$ is equal to one minus the duty cycle of inductor current $I_L$ and $C_{out}$ is a capacitance of output capacitor 38. The quotient $$\frac{C_{out}}{D_i'}$$

may be unknown or uncertain, nut may be estimated. For example, in some embodiments, load estimator 44 may estimate the quotient $$\frac{C_{out}}{D_i'}$$

using fixed values. However, it an input voltage (e.g., voltage VDD_SENSE) is known, the inverse of $D_i'$ may be approximately equal to the quotient of supply voltage $V_{SUPPLY}$ divided by such input voltage. Thus, the foregoing equation for updating target average current $I_{avg}$ may be written:

$$I_{avg} = I_R - s_1 \cdot \frac{V_{SUPPLY}}{\text{VDD\_SENSE}} \cdot C_{out}$$

However, such relationship may have uncertainty due to the approximation of output capacitance $C_{out}$ and the assumption that boost converter 20 is lossless. But, such uncertainty may be eliminated by using both measurements for rise current $I_R$ and fall current $I_F$, as given by the equation:

$$I_{avg} = I_F - \frac{s_2}{s_1 - s_2} \cdot (I_R - I_F)$$

If it is assumed that the increase in voltage from threshold voltage $V_2$ to threshold voltage $V_3$ is equal in magnitude to the decrease in voltage from threshold voltage $V_3$ to threshold voltage $V_2$, then the foregoing equation for updating target average current $I_{avg}$ may be written:

$$I_{avg} = \left(\frac{I_R}{\frac{\Delta t_2}{\Delta t_1} + 1}\right) + \left(1 - \frac{1}{\frac{\Delta t_2}{\Delta t_1} + 1}\right)I_F$$

The two approaches above for updating target average current $I_{avg}$ may each have their own advantages and disadvantages. For example, the update based on one current measurement may be better at detecting large, fast transients, but could be inaccurate due to assumptions regarding the duty cycle and output capacitance $C_{out}$, and also assumes that changes in voltage and measurements of current are known exactly. The update based on two current measurements may be more robust against offsets in the changes in voltage and measurements of current, but such approach assumes the load of power converter 20 is fixed over both measurements, which may not be the case, especially in the presence of large transients. Thus, in some embodiments, a hybrid approach may be used in which the single-measurement approach is used if only one measurement is available or if the single measurement is larger (or smaller) than the dual measurement by more than the band of uncertainty of the single-measurement approach, and the dual-measurement approach is used otherwise.

Figure 8:
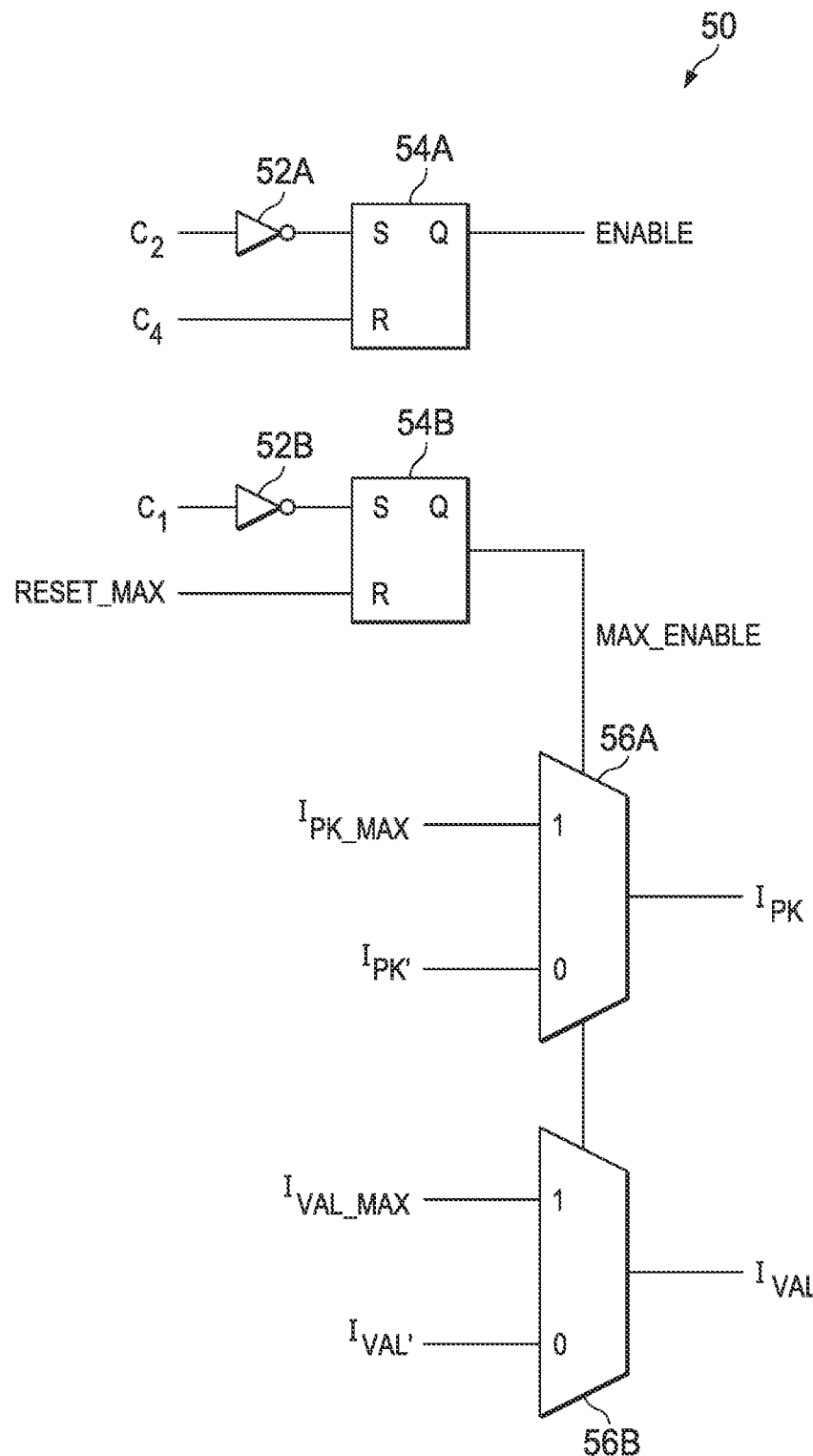
FIG. 8 illustrates a block diagram of selected components of an outer control loop subsystem of the current controller shown in FIG. 5, in accordance with embodiments of the present disclosure.

FIG. 8 illustrates a block diagram of selected components of an outer loop control subsystem 50 of current controller 46, in accordance with embodiments of the present disclosure. As shown in FIG. 8, current controller 46 may be implemented using logic inverters 52A and 52B, set-reset latches 54A and 54B, and multiplexers 56A and 56B.

Logic inverter 52A may invert comparison signal $C_2$ and set-reset latch 54A may hysteretically generate control signal ENABLE such that control signal ENABLE is asserted when supply voltage $V_{SUPPLY}$ falls below threshold voltage $V_2$ and is deasserted when supply voltage $V_{SUPPLY}$ rises above threshold voltage $V_4$. When control signal ENABLE is deasserted, control circuit 40 may disable charge switches 34 and rectification switches 36 and power converter 20 may be operated in the boost inactive mode.

Further, inverter 52B may invert comparison signal $C_1$ and set-reset latch MB may hysteretically generate control signal MAX_ENABLE that indicates whether a maximum for target average current $I_{avg}$ should be generated by control circuit 40. Receipt of control signal RESET_MAX may deassert control signal MAX_ENABLE, to return control of peak current threshold $I_{pk}$ and valley current threshold $I_{val}$ to the inner control loop. Multiplexer 56A may, based on control signal MAX_ENABLE, a maximum for peak current threshold $I_{pk}$ and a target peak current threshold $I_{pk}$ (e.g., derived from target average current $I_{avg}$ calculated by load estimator 44), generate a peak current threshold $I_{pk}$. Similarly, multiplexer 56B may, based on control signal MAX_ENABLE, a maximum for valley current threshold $I_{val}$, and a target valley current threshold $I_{val}$ (e.g., derived from target average current $I_{avg}$ calculated by load estimator 44), generate a valley current threshold $I_{val}$.

Figure 9:
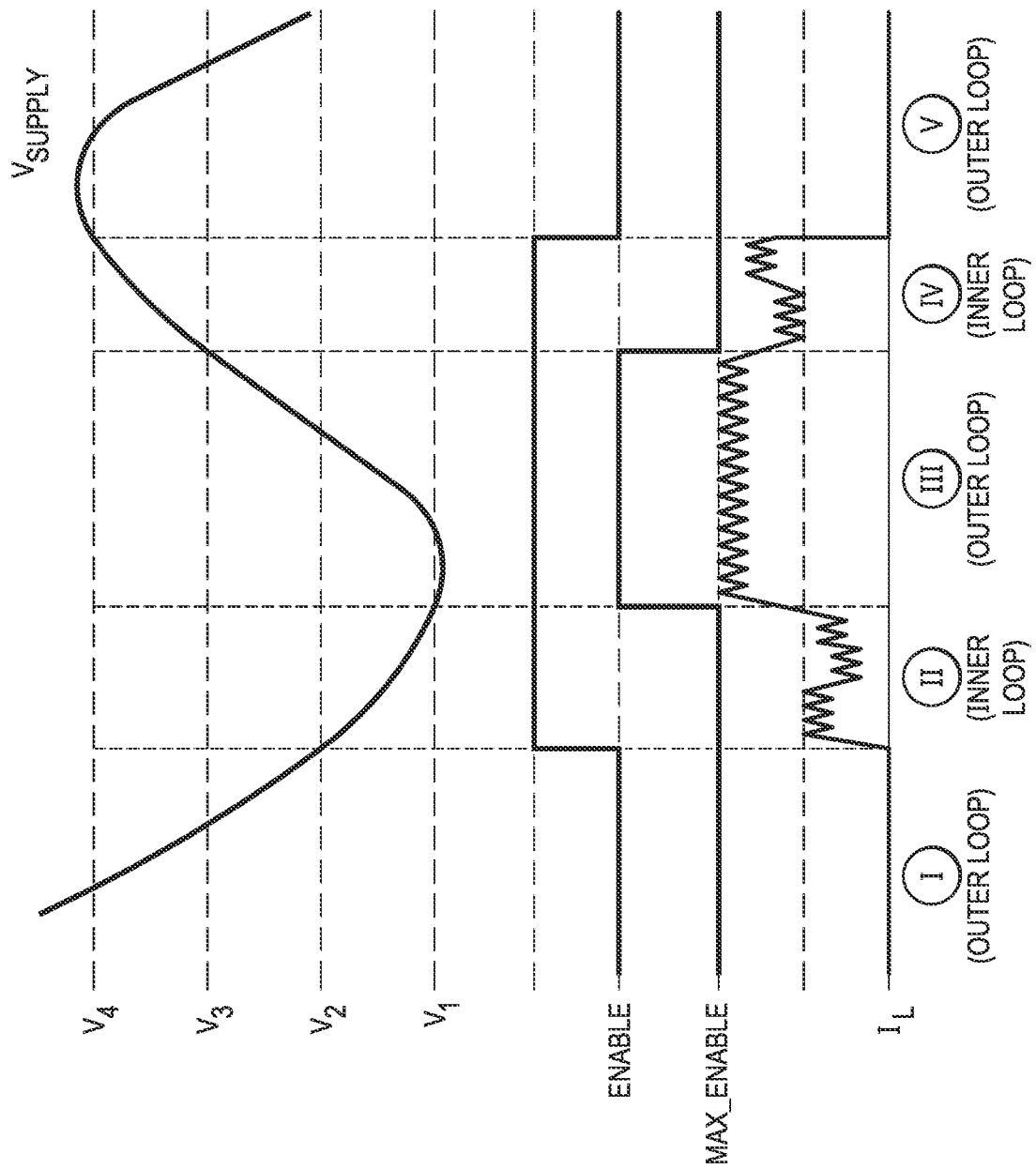
FIG. 9 illustrates example waveforms depicting an example of outer loop control for a boost converter, in accordance with embodiments of the present disclosure.

To further illustrate outer loop control by current controller 46, reference is made to FIG. 9. As shown in FIG. 9, in Region I of the waveforms, supply voltage $V_{SUPPLY}$ exceeds threshold voltage $V_4$, and boost converter 20 may be placed in the boost inactive mode as set-reset latch MA may cause control signal ENABLE to be deasserted, leaving boost converter 20 with a high-impedance. Accordingly, in Region I, the load of boost converter 20 may cause a decrease in supply voltage $V_{SUPPLY}$.

When supply voltage $V_{SUPPLY}$ decreases below threshold voltage $V_2$, set-reset latch MA may cause control signal ENABLE to be asserted, and boost converter 20 may enter the boost active mode. In Region II of the waveforms shown in FIG. 9, load estimator 44 may in effect control peak current threshold $I_{pk}$ and valley current threshold $I_{val}$, through the estimate of target average current $I_{avg}$ performed by load estimator 44. However, in the specific example shown in FIG. 9, load estimator 44 may not "turn around" supply voltage $V_{SUPPLY}$ quick enough, and supply voltage $V_{SUPPLY}$ may continue to decrease.

Accordingly, supply voltage $V_{SUPPLY}$ may decrease below threshold voltage $V_1$, thus causing set-reset latch MB to set, asserting control signal MAX_ENABLE, forcing peak current current $I_{pk}$ and target valley current $I_{val}$ to their maximum values (maximum peak current $I_{pk-max}$ and maximum valley current $I_{avg-max}$) in Region III of FIG. 9. After sufficient increase in supply voltage $V_{SUPPLY}$, set-reset latch MB may reset and deassert control signal MAX_ENABLE, and load estimator 44 may again regain control as shown in Region IV of the waveforms. If supply voltage $V_{SUPPLY}$ increases further again in excess of threshold voltage $V_4$, set-reset latch MA may again deassert control signal ENABLE, causing boost converter 20 to enter the boost inactive mode.

Accordingly, the outer loop implemented by current controller 46 may toggle boost converter 20 between a maximum current and high-impedance state, and bound a ripple in supply voltage $V_{SUPPLY}$ to approximately between threshold voltages $V_1$ and $V_4$ even when inner loop control of load estimator 44 fails to regulate supply voltage $V_{SUPPLY}$.

Figure 10:
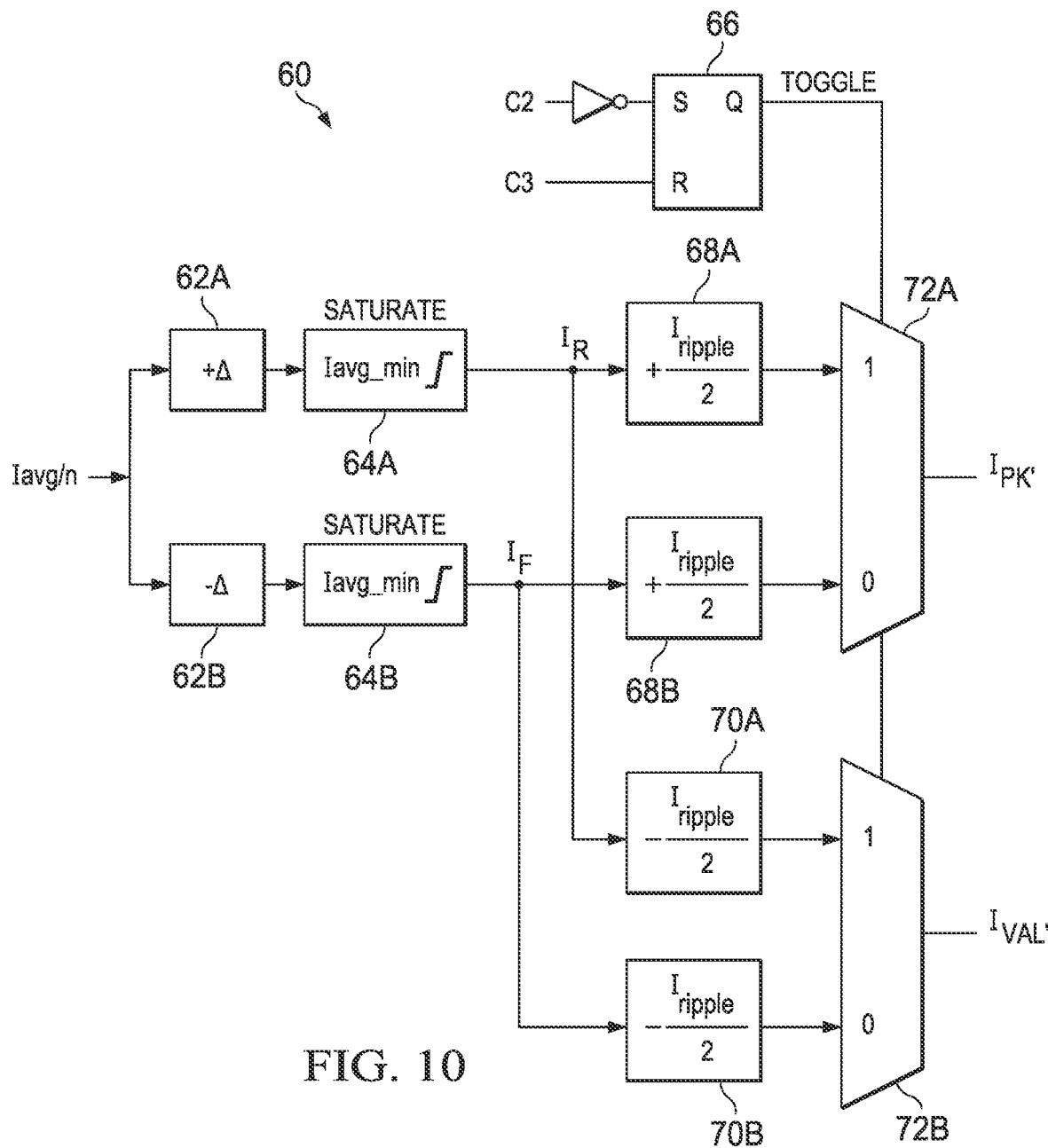
FIG. 10 illustrates a block diagram of selected components of an inner control loop subsystem of the current controller shown in FIG. 5, in accordance with embodiments of the present disclosure.
Figure 11:
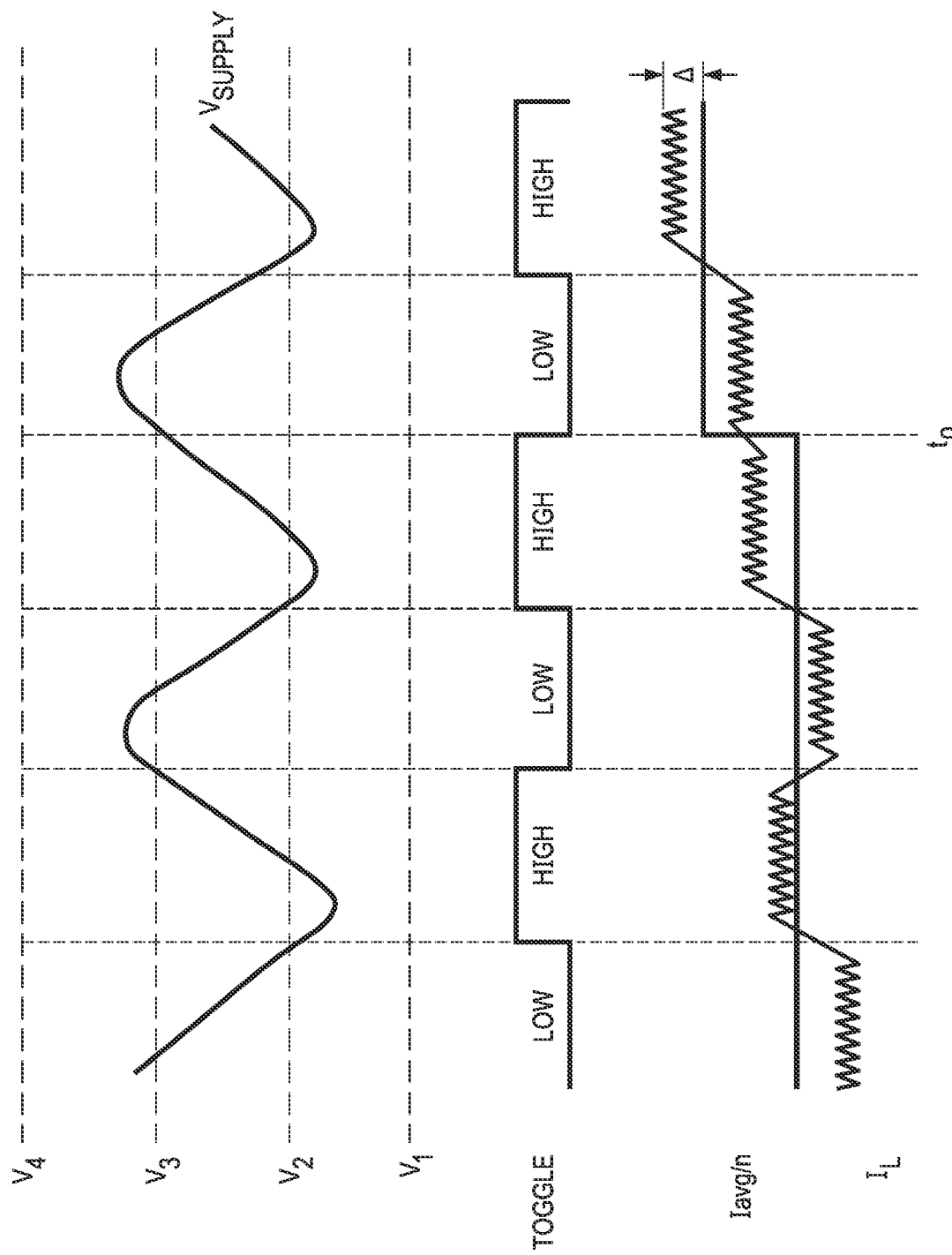
FIG. 11 illustrates example waveforms depicting an example of inner loop control for a boost converter, in accordance with embodiments of the present disclosure.

FIG. 10 illustrates a block diagram of selected components of an inner control loop subsystem 60 of current controller 46, in accordance with embodiments of the present disclosure. FIG. 11 illustrates example waveforms depicting examples of inner loop control for boost converter 20, in accordance with embodiments of the present disclosure.

As shown in FIG. 10, inner control loop subsystem 60 may receive target average current $I_{avg}$ calculated by load estimator 44, divide such target average current $I_{avg}$ by a number n of phase 24 present in boost converter 20, and apply each of a positive offset $+\Delta$ and a negative offset $-\Delta$ to target average current $I_{avg}/n$ by offset blocks 62A and 62B, respectively. The results of offset blocks 62A and 62B may be respectively saturated to a minimum value by saturation blocks 64A and 64B to generate rise current $I_R$ and fall current $I_F$, respectively. Adder blocks 68A and 68B may add one-half of ripple current $I_{ripple}$ to each of rise current $I_R$ and fall current $I_F$ and adder blocks 70A and 70B may subtract one-half of ripple current $I_{ripple}$ from each of rise current $I_R$ and fall current $I_F$. Based on comparison signals $C_2$ and $C_3$, latch 66 may selectively assert and deassert control signal TOGGLE to toggle selection of multiplexers 72A and 72B to:

In the event control signal TOGGLE is asserted due to supply voltage $V_{SUPPLY}$ decreasing below threshold voltage $V_2$, generate an intermediate peak current threshold $I_{pk}'$ and an intermediate valley current threshold $I_{val}'$ such that $I_{pk}'=I_R+I_{ripple}/2$ and $I_{val}'=I_R-I_{ripple}/2$, and the mean inductor current is rise current $I_R$.

In the event control signal TOGGLE is deasserted due to supply voltage $V_{SUPPLY}$ increasing above threshold voltage $V_3$, generate intermediate peak current threshold $I_{pk}'$ and intermediate valley current threshold $I_{val}'$ such that $I_{pk}'=I_F+I_{ripple}/2$ and $I_{val}'=I_F-I_{ripple}/2$, and the mean inductor current is fall current $I_F$.

As shown in FIG. 8 above, intermediate peak current threshold $I_{pk}'$ and intermediate valley current threshold $I_{val}'$ may be used by outer loop control subsystem 50 to generate peak current threshold $I_{pk}$ and valley current threshold $I_{val}$.

Thus, toggling of control signal TOGGLE may maintain regulation of $V_{SUPPLY}$ between threshold voltage $V_2$ and threshold voltage $V_3$. For example, when control signal TOGGLE is high, the average per phase current may be set to rise current $I_R$. Because this value of current is offset from target average current $I_{avg}$ by positive offset $+\Delta$, it may cause supply voltage $V_{SUPPLY}$ to rise. On the other hand, when control signal TOGGLE is low, the average per phase current may be set to fall current $I_F$. Because this value of current is offset from target average current $I_{avg}$ by negative offset $-\Delta$, it may cause supply voltage $V_{SUPPLY}$ to fall.

Occasionally, a change in loading at the output of power converter 20 may lead to a change in target average current $I_{avg}$, as shown at time $t_0$ in FIG. 11, in which case load estimator 44 may modify target average current $I_{avg}$ as described above.

Figure 12:
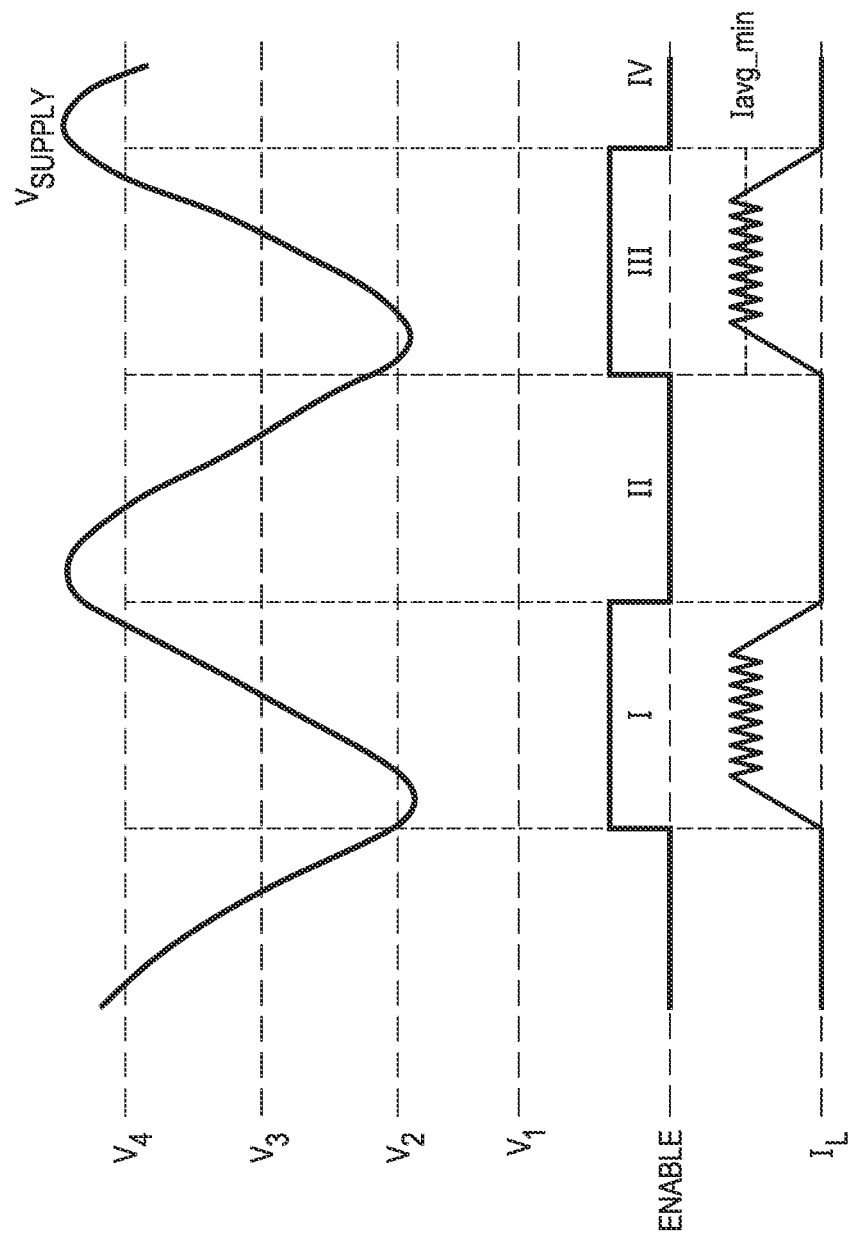
FIG. 12 illustrates example waveforms depicting an example of inner loop control for a boost converter in a light-load scenarios, in accordance with embodiments of the present disclosure.

FIG. 12 illustrates example waveforms depicting examples of inner loop control for boost converter 20 in light-load scenarios, in accordance with embodiments of the present disclosure. For light-loads, target average current $I_{avg}$ calculated by load estimator 44 may be larger than a minimum target average current $I_{avg\_min}$ applied by saturations blocks 64A and 64B. Because rise current $I_R$ and fall current $I_F$ may be saturated in this scenario, inductor current $I_L$ may be larger than is required for steady-state operation of boost converter 20, forcing supply voltage $V_{SUPPLY}$ to have a positive slope in Regions I and III of FIG. 12. When supply voltage $V_{SUPPLY}$ crosses above threshold voltage $V_4$, set-reset latch 54A from outer loop control subsystem 50 may cause boost converter 20 to enter the boost inactive region, thus leading to forcing supply voltage $V_{SUPPLY}$ to have a negative slope in Regions II and IV of FIG. 12 due to the high-impedance state of boost converter 20. In light-load conditions, toggling between the boost active state and the boost inactive state with fixed saturation thresholds for peak current threshold $I_{pk}$ and valley current threshold $I_{val}$ may maximize power efficiency.

In a simple implementation of control circuit 40, control circuit 40 may be implemented as a digital control system that sets control parameters for peak current threshold $I_{pk}$, valley current threshold $I_{val}$, control signal ENABLE, and the number n of phases 24 enabled. However, due to sample-and-hold circuitry that may be employed in such digital implementation and incumbent processing delays, several clock cycles of delay may occur between when comparators 42 toggle and when new control parameters are determined. Such delay may contribute to overshoot and undershoot in supply voltage $V_{SUPPLY}$ generated by power converter 20, which may lead to undesirable ripple and excessive voltage droop on supply voltage $V_{SUPPLY}$. It may be desirable to have a faster response to quick load transients on supply voltage $V_{SUPPLY}$ compared to that which could be supported by a fully digital implementation of control circuit 40.

Figure 13:
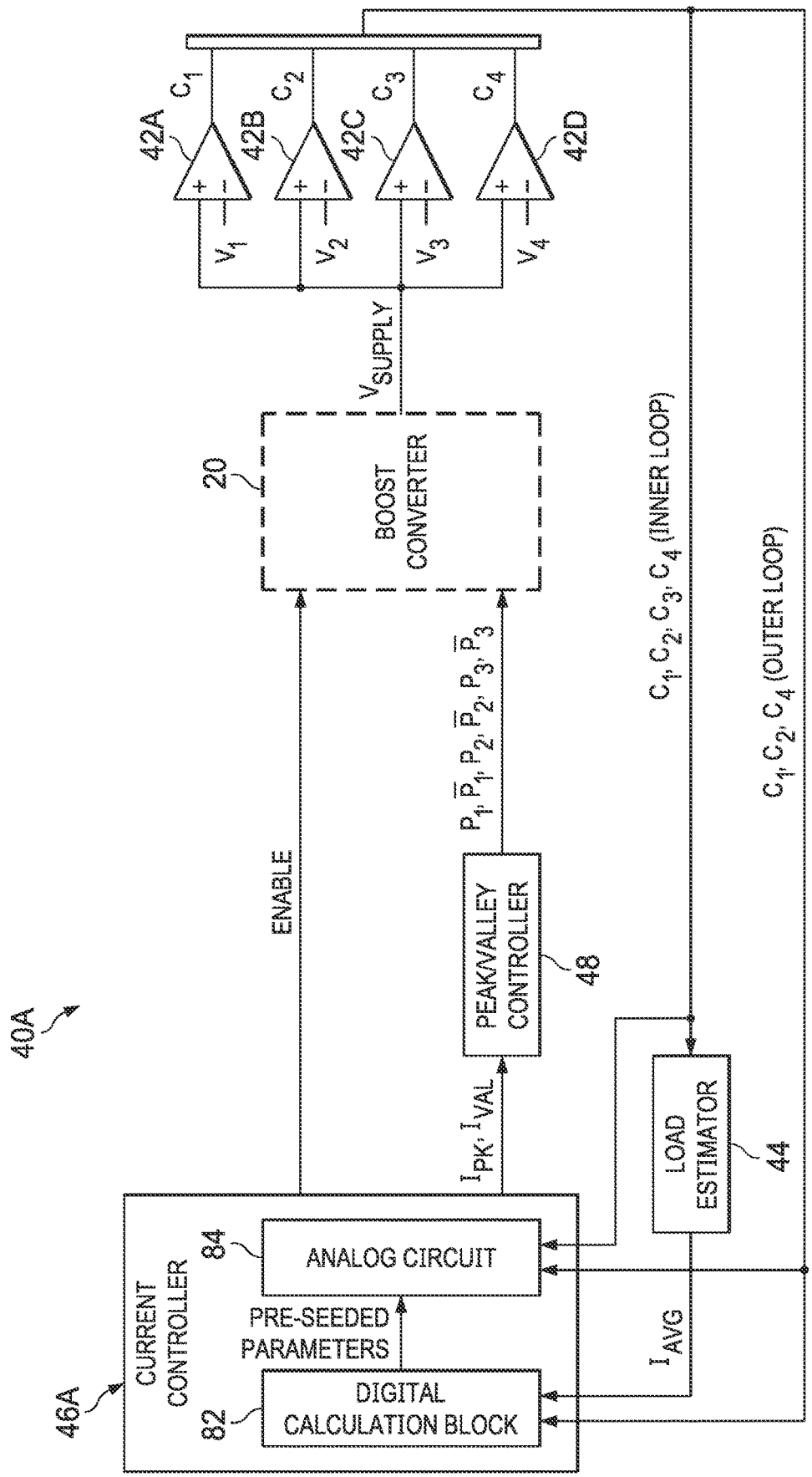
FIG. 13 illustrates a block diagram of selected components of another example control circuit for a boost converter, in accordance with embodiments of the present disclosure.

FIG. 13 illustrates a block diagram of selected components of control circuit 40A, in accordance with embodiments of the present disclosure. Control circuit 40A may be functionally and/or structurally similar in many respects to control circuit 40 shown in FIG. 5, with a main difference being that current controller 46A is split into a digital calculation block 82 and an analog circuit 84. As described in greater detail below, analog circuit 84 may minimize delays that would be present in a fully-digital implementation by using pre-seeded values for control parameters generated by digital calculation block 82 and selecting among such pre-seeded values by analog circuit 84 in order to generate control parameters communicated to peak/valley controller 48 and boost converter 20. Analog circuit 84 may be driven directly by comparators 42, such that when comparators 42 toggle, analog circuit 84 immediately changes state and chooses generated new control parameters for peak current threshold $I_{pk}$, valley current threshold $I_{val}$, control signal ENABLE, and the number n of phases 24 enabled. Such manner of changing states and updating control parameters may create a low-latency path from comparators 42 to new, updated control parameters. On the other hand, digital calculation block 82 may be configured to calculate the pre-seeded parameters based on the outputs of comparators and its internal control algorithm.

Figure 14:
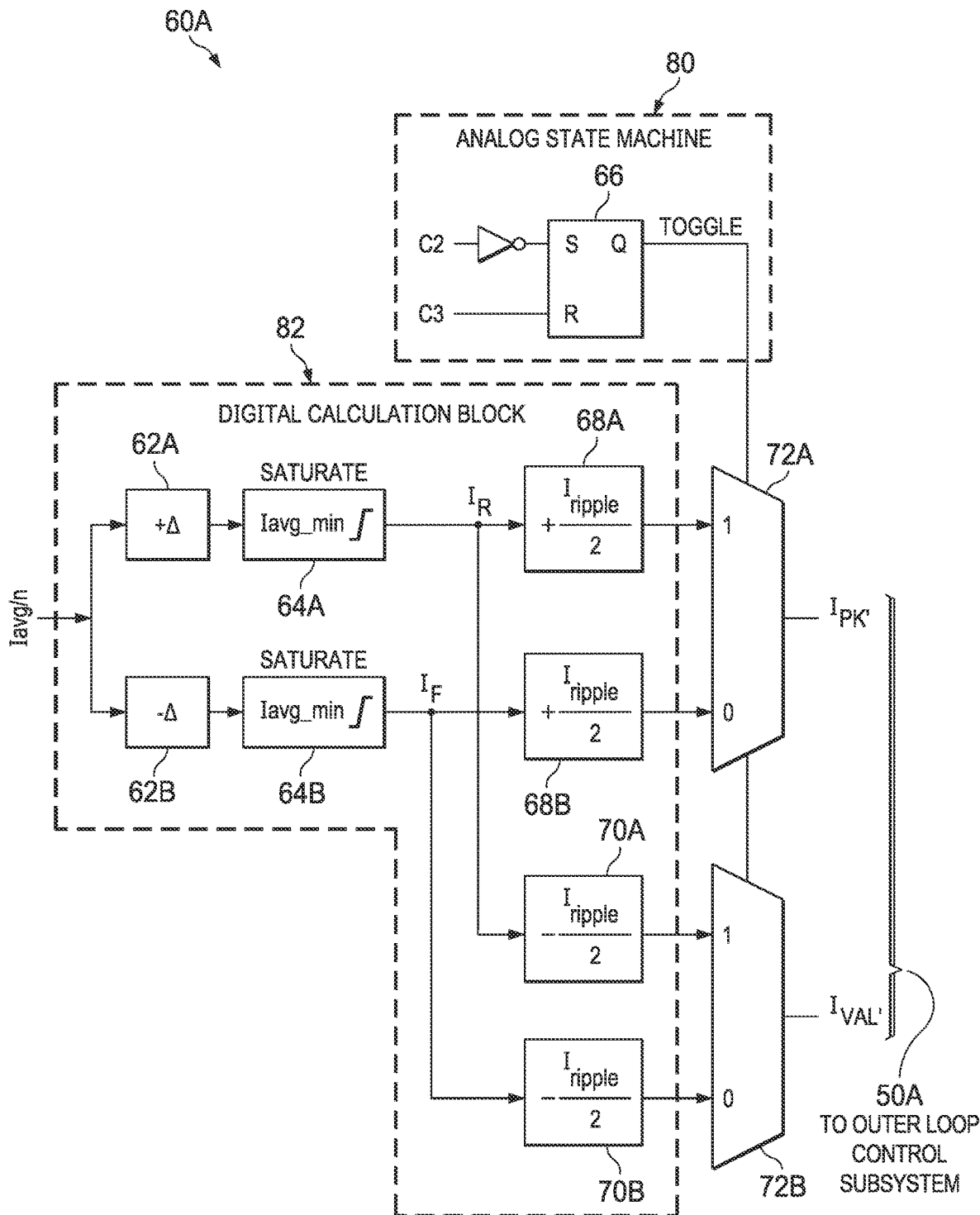
FIG. 14 illustrates a block diagram of selected components of an inner control loop subsystem of the current controller shown in FIG. 13, in accordance with embodiments of the present disclosure.

FIG. 14 illustrates a block diagram of selected components of an inner control loop subsystem 60A of current controller 46A, in accordance with embodiments of the present disclosure. Inner loop control subsystem 60A may be functionally and/or structurally similar in many respects to inner loop control subsystem 60 shown in FIG. 10, except that multiplexers 72A and 72B and a portion of analog state machine 80 may be implemented by analog circuit 84, and other components of inner loop control subsystem 60A may be implemented by digital calculation block 82. As shown in FIG. 14, digital calculation block 82 may generate pre-seeded values based on all comparison signals $C_1$, $C_2$, $C_3$, and $C_4$, and analog state machine 86 may be configured to, based on comparison signals $C_2$ and $C_3$, control selection of such pre-seeded values with multiplexers 72A and 72B in order generate intermediate peak current threshold $I_{pk}'$ and intermediate valley current threshold $I_{val}'$.

Figure 15:
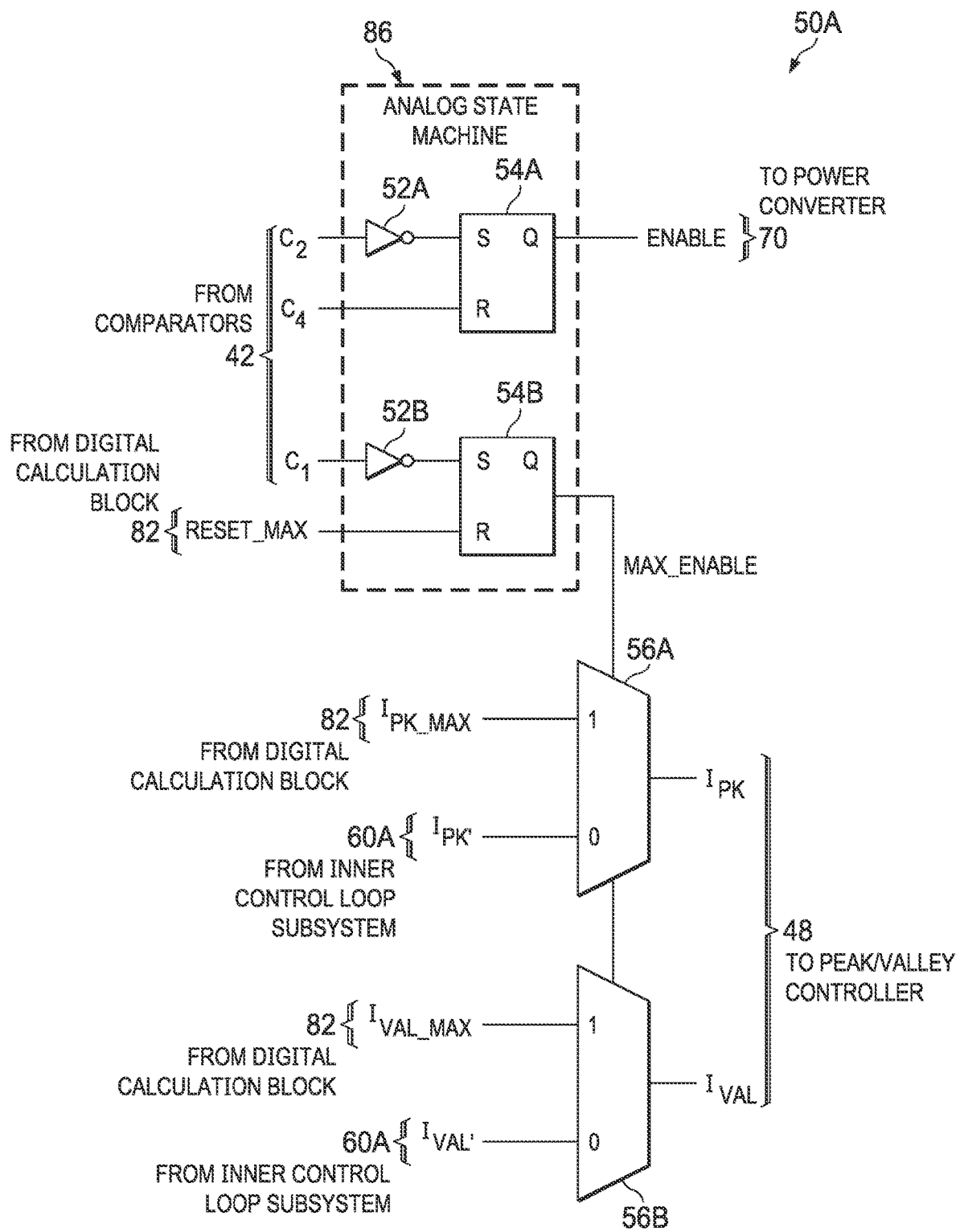
FIG. 15 illustrates a block diagram of selected components of an outer control loop subsystem of the current controller shown in FIG. 13, in accordance with embodiments of the present disclosure.

FIG. 15 illustrates a block diagram of selected components of an outer loop control loop subsystem 50A of current controller 46A, in accordance with embodiments of the present disclosure. Outer loop control subsystem 50A may be functionally and/or structurally similar in many respects to outer loop control subsystem 50 shown in FIG. 8, except that multiplexers 56A and 56B and a portion of analog state machine 86 may be implemented by analog circuit 84. As shown in FIG. 15, analog state machine 86 may be configured to, based on comparison signal $C_1$ and a control signal RESET_MAX generated by digital calculation block 82, control between selection of pre-seeded values for maximum peak current threshold $I_{pk\_max}$ and maximum valley current threshold $I_{val\_max}$ on the one hand and intermediate peak current threshold $I_{pk}'$ and intermediate valley current threshold $I_{val}'$ generated by inner control loop subsystem 60A on the other hand. Further, analog state machine 86 may be configured to, based on comparison signals $C_2$ and $C_4$, control signal ENABLE for power converter 20.

In a boost converter 20 having multiple phases 24, all phases 24 may use identical set points for peak current threshold $I_{pk}$ and valley current threshold $I_{val}$, and a lookup table or other suitable approach may be used to determine how many phases 24 are active based on target average current $I_{avg}$. Further, such lookup table or other suitable approach may have hysteresis to prevent excessive enabling and disabling of an individual phase 24. In addition, the lookup table or another lookup table may be used to determine how many phases 24 are to be enabled in a maximum current state of power converter 20 (e.g., supply voltage $V_{SUPPLY}$<threshold voltage $V_1$).

Although the foregoing discussion contemplates current control and voltage regulation of a boost converter 20, it is understood that similar or identical approaches may be applied to other types of inductor-based power converters, including without limitation buck converters and buck-boost converters.

Referring back to FIGS. 3A-3C, each power inductor 32 of respective phases 24 may draw a respective inductor current $I_L$ (e.g., $I_{L1}$, $I_{L2}$, and $I_{L3}$). Also, because all phases 24 may use identical set points for peak current threshold $I_{pk}$ and valley current threshold $I_{val}$ as described above, inductor currents $I_{L1}$, $I_{L2}$, and $I_{L3}$ would all be expected to be in phase with one another in the event that impedances of each phase 24 were identical. However, in practical implementation, if impedances of each phase 24 are different but close in value, the respective inductor currents $I_{L1}$, $I_{L2}$, and $I_{L3}$ may slowly drift in and out of phase with one another. But relatively long periods may exist when two or more of respective inductor currents $I_{L1}$, $I_{L2}$, and $I_{L3}$ are in phase with one another.

Figure 16:
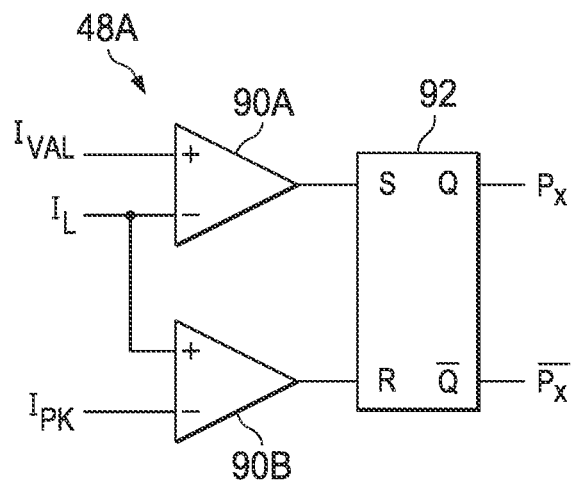
FIG. 16 illustrates a block diagram of selected components of an example peak/valley controller, in accordance with embodiments of the present disclosure.

FIG. 16 illustrates a block diagram of selected components of a peak/valley controller 48A, in accordance with embodiments of the present disclosure. In some embodiments, peak/valley controller 48A may be used to implement peak/valley controller 48 shown in FIG. 5. As shown in FIG. 16, peak/valley controller 48A may include comparators 90A and 90B and latch 92. Comparator 90A may be configured to compare an inductor current $I_L$ to valley current threshold $I_{val}$, while comparator 90B may be configured to compare an inductor current $I_L$ to peak current threshold $I_{pk}$. Latch 92 (which may be implemented as a set-reset latch or other suitable circuit or logic device) may generate control signals $P_x$ (e.g., control signals $P_1$, $P_2$, $P_3$, etc.) and $P_x^-$ (e.g., control signals $P_1^-$, $P_2^-$, $P_3^-$, etc.) for controlling switches of boost converter 20 as shown in FIG. 5. For example, when inductor current $I_L$ falls below valley current threshold $I_{val}$, latch 92 may assert control signal $P_x$ and deassert control signal $P_x^-$, and when inductor current $I_L$ falls below valley current threshold $I_{val}$, latch 92 may deassert control signal $P_z$ and assert control signal $P_x^-$.

Figure 17A:
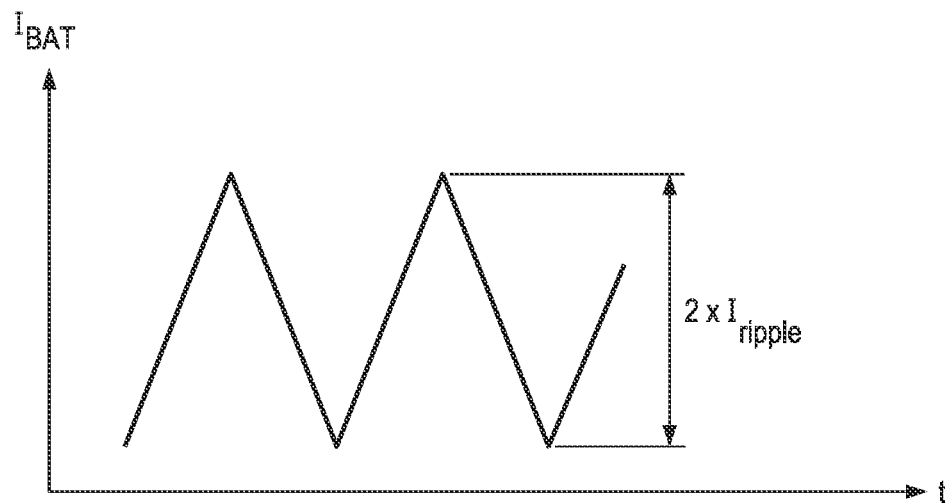
FIGS. 17A-17C illustrate graphs of various example waveforms for battery current, boost converter inductor currents, and boost converter control signals versus time, in accordance with embodiments of the present disclosure.
Figure 17B:
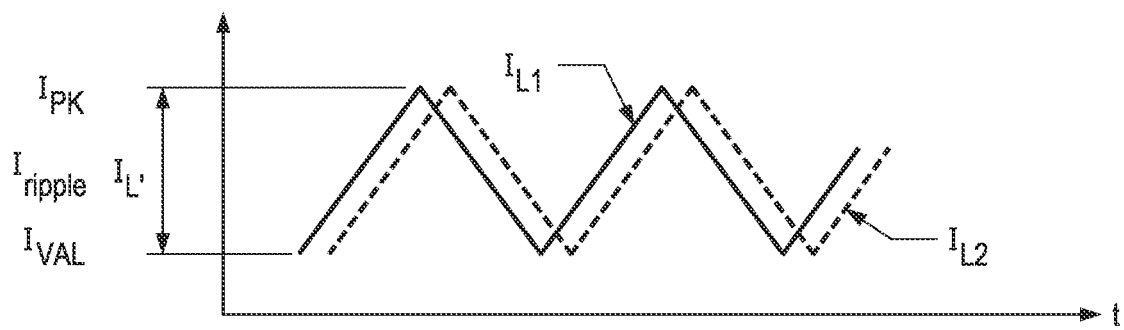
Figure 17C:
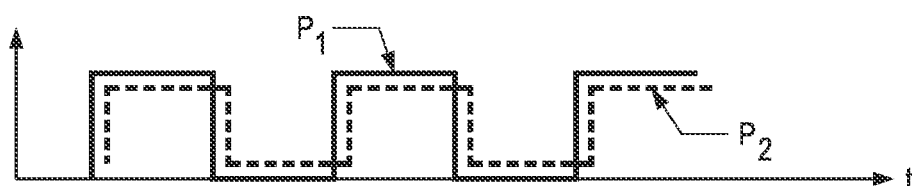

FIGS. 17A-17C illustrate graphs of various example waveforms for battery current $I_{BAT}$, inductor currents $I_{L1}$ and $I_{L2}$, and control signals $P_1$ and $P_2$ versus time using peak/valley controller 48A, in accordance with embodiments of the present disclosure. For purposes of clarity and exposition, only two inductor currents $I_{L1}$ and $I_{L2}$ and two control signals $P_1$ and $P_2$ are shown in FIGS. 17A-17C, although boost converter 20 may include more than two phases 24 with other inductor currents and control signals other than those shown in FIGS. 17A-17C. As shown in FIGS. 17A-17B, when individual inductor currents $I_{L1}$ and $I_{L2}$ are in phase or nearly in phase with one another, a large ripple (e.g., equal to approximately two times the ripple current $I_{ripple}$ present in a single inductor current $I_L$) may result on battery current $I_{BAT}$. If a number N of multiple phases 24 with in-phase inductor current $I_L$ are present, then the ripple on battery current $I_{BAT}$ may be N times the ripple current $I_{ripple}$ present in a single inductor current $I_L$.

Such a ripple on battery current $I_{BAT}$ may be problematic for numerous reasons, especially if the ripple is at a high frequency. For example, such ripple may result in decreased efficiency of boost converter 20, difficulty in sensing battery current $I_{BAT}$, or may parasitically couple into surrounding circuitry leading to electromagnetic interference. Further, such current ripple may appear on the input voltage to boost converter 20 and on supply voltage $V_{SUPPLY}$, interfering with control of boost converter 20 by control circuit 40 (e.g., interference with feedback control of control circuit 40 dependent on the value of supply voltage $V_{SUPPLY}$).

To overcome problems associated with in-phase inductor currents $I_L$, peak/valley controller 48A may be modified from that shown in FIG. 16 in order to perform one or both of time-domain phase randomization or level-domain phase randomization, as described in greater detail below.

Figure 18:
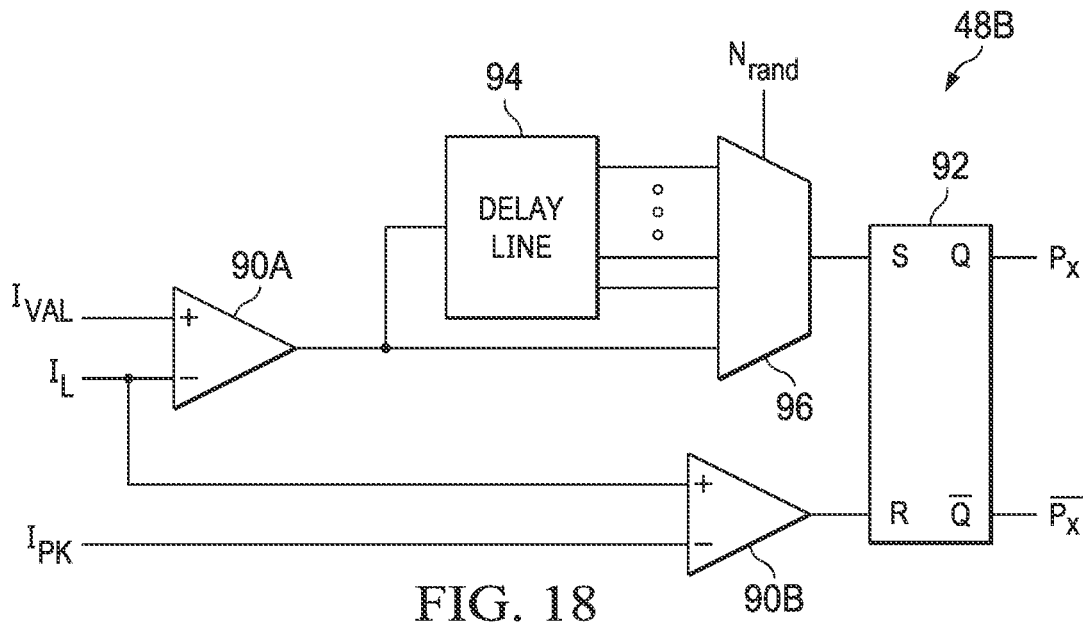
FIG. 18 illustrates a block diagram of selected components of an example peak/valley controller with circuitry for performing time-domain phase randomization of inductor currents in a boost converter, in accordance with embodiments of the present disclosure.
Figure 19:
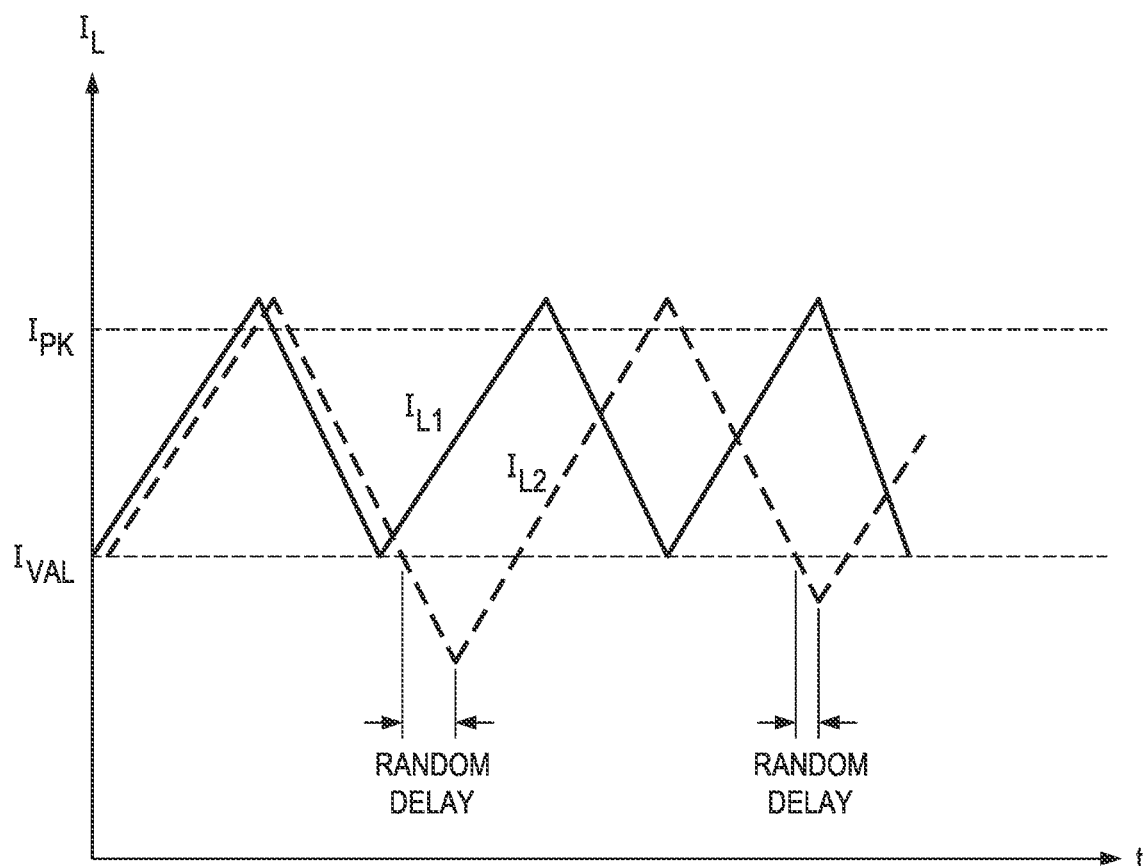
FIG. 19 illustrates a graph of example waveforms for boost converter inductor currents with time-domain phase randomization, in accordance with embodiments of the present disclosure.

FIG. 18 illustrates a block diagram of selected components of an example peak/valley controller 48B with circuitry for performing time-domain phase randomization of inductor currents $I_L$ in boost converter 20, in accordance with embodiments of the present disclosure. In some embodiments, peak/valley controller 48B may be used to implement peak/valley controller 48 shown in FIG. 5. In addition, peak/valley controller 48B may be similar or identical in many respects to peak/valley controller 48A of FIG. 16, with a main difference being that peak/valley controller 48B may include additional circuitry interfaced between comparator 90A and the set input of latch 92 in order to perform time-domain phase randomization with respect to comparison of inductor current $I_L$ to valley current threshold $I_{val}$. As shown in FIG. 18, the output of comparator 90A may be received by a tapped delay line 94 which may generate one or more outputs, each delaying the output of comparator 90A by a respective delay amount. Further, a multiplexer 96 may receive the un-delayed output of comparator 90A and the output(s) of delay line 94 and select one of such outputs based on a random number $n_{rand}$, such that the comparator signal received by the set input of latch 92 is delayed by a random amount of time. As a result, as shown in FIG. 19, random number $n_{rand}$ may randomly delay the output transition of latch 92 from Q=0 to Q=1, which may delay transition from a transfer state of a phase 24 to a charging state of such phase 24, and thus also delay occurrence of a valley of an inductor current $I_L$ in such phase 24. As also shown in FIG. 19, such delay may also result in randomly delaying the output transition of latch 92 from Q=1 to Q=0, which may delay transition from the charging state of the phase 24 to the transfer state of such phase 24, and thus also delay occurrence of a peak of an inductor current $I_L$ in such phase 24. Such randomization may minimize phase alignment of individual inductor currents $I_L$ in phases 24.

The additional circuitry used to provide time-domain phase randomization (e.g., delay line 94 and multiplexer 96) may be implemented to delay the result of the comparison of inductor current $I_L$ to valley current threshold $I_{val}$ (e.g., as shown in FIG. 18), to delay the result of the comparison of inductor current $I_L$ to peak current threshold $I_{pk}$, or both. This additional randomization circuitry may be replicated for some or all of phases 24. In other words, in some embodiments, one or more phases 24 may each be controlled by a respective peak/valley controller 48A while one or more other phases 24 may each be controlled by a respective peak/valley controller 48B providing time-domain randomization of inductor current $I_L$ in some but not all of phases 24; and in other embodiments, phases 24 may each be controlled by a respective peak/valley controller 48B providing time-domain randomization of inductor current $I_L$ in all of phases 24.

Figure 20:
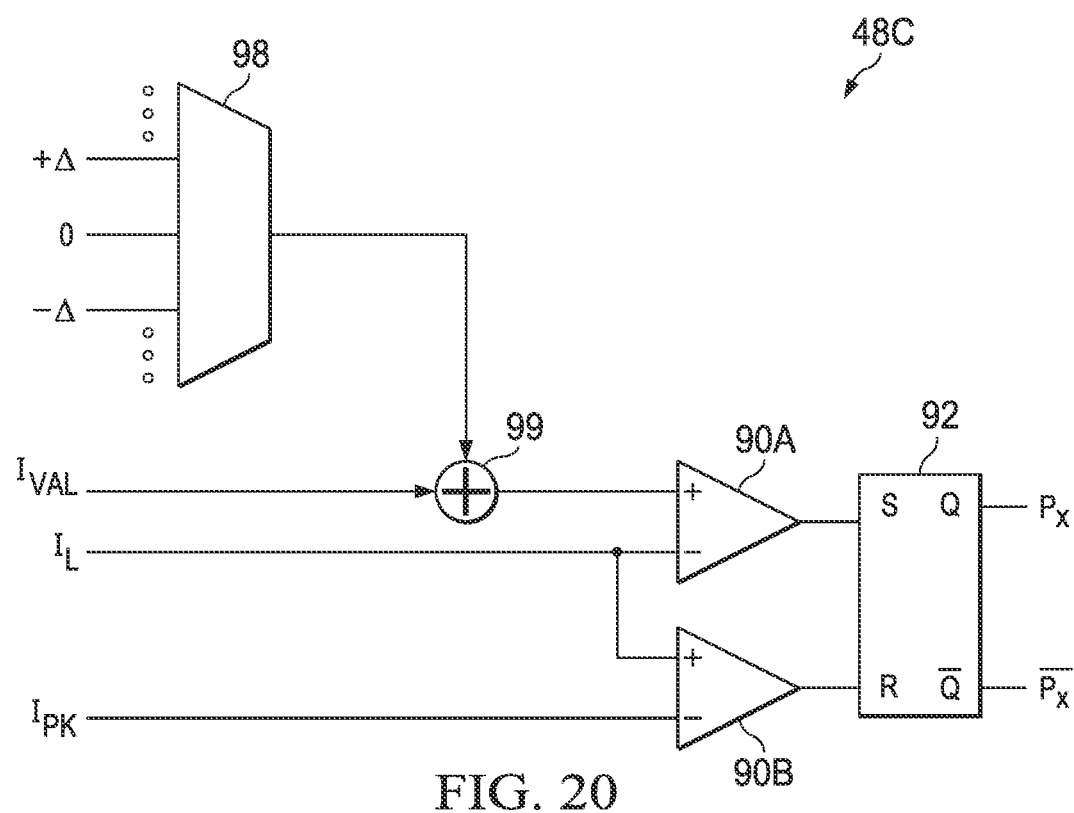
FIG. 20 illustrates a block diagram of selected components of an example peak/valley controller with circuitry for performing level-domain phase randomization of inductor currents in a boost converter, in accordance with embodiments of the present disclosure.
Figure 21:
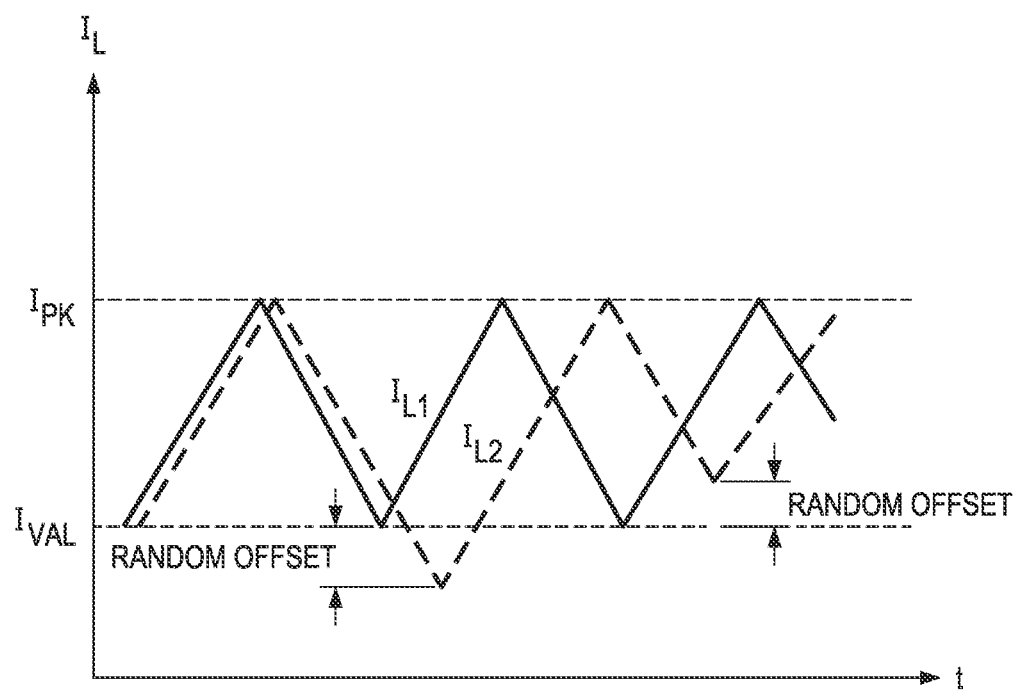
FIG. 21 illustrates a graph of example waveforms for boost converter inductor currents with level-domain phase randomization, in accordance with embodiments of the present disclosure.

FIG. 20 illustrates a block diagram of selected components of an example peak/valley controller 48C with circuitry for performing level-domain phase randomization of inductor currents $I_L$ in boost converter 20, in accordance with embodiments of the present disclosure. In some embodiments, peak/valley controller 48C may be used to implement peak/valley controller 48 shown in FIG. 5. In addition, peak/valley controller 48C may be similar or identical in many respects to peak/valley controller 48A of FIG. 16, with a main difference being that peak/valley controller 48C may include additional circuitry interfaced in the path of valley current threshold $I_{val}$ in order to perform level-domain phase randomization of one or more individual inductor currents $I_L$. As shown in FIG. 20, a multiplexer 98 may receive a plurality of level adjustments (e.g., −Δ, 0, +Δ, etc.) for modifying a level of valley current threshold $I_{val}$ and select one of such outputs based on a random number $n_{rand}$. In turn, a combiner 99 may combine such selected level adjustment with valley current threshold $I_{val}$ such that a modified valley current threshold $I_{val}$ received by latch 92 includes a random level adjustment. As a result, as shown in FIG. 21, random number $n_{rand}$ may randomly delay (or advance) the output transition of latch 92 from Q=0 to Q=1, which may delay transition from a transfer state of a phase 24 to a charging state of such phase 24, and thus also delay occurrence of a valley of an inductor current $I_L$ in such phase 24. As also shown in FIG. 21, such delay may also result in randomly delaying the output transition of latch 92 from Q=1 to Q=0, which may delay transition from the charging state of the phase 24 to the transfer state of such phase 24, and thus also delay occurrence of a peak of an inductor current $I_L$ in such phase 24. Such randomization may minimize phase alignment of individual inductor currents $I_L$ in phases 24.

The additional circuitry used to provide level-domain phase randomization (e.g., multiplexer 98 and combiner 99) may be implemented to apply a level adjustment to valley current threshold $I_{val}$ (e.g., as shown in FIG. 20), apply a level adjustment to peak current threshold $I_{pk}$, or both. This additional randomization circuitry may be replicated for some or all of phases 24. In other words, in some embodiments, one or more phases 24 may each be controlled by a respective peak/valley controller 48A while one or more other phases 24 may each be controlled by a respective peak/valley controller 48C providing level-domain randomization of inductor current $I_L$ in some but not all of phases 24; and in other embodiments, phases 24 may each be controlled by a respective peak/valley controller 48C providing time-domain randomization of inductor current $I_L$ in all of phases 24.

Figure 22:
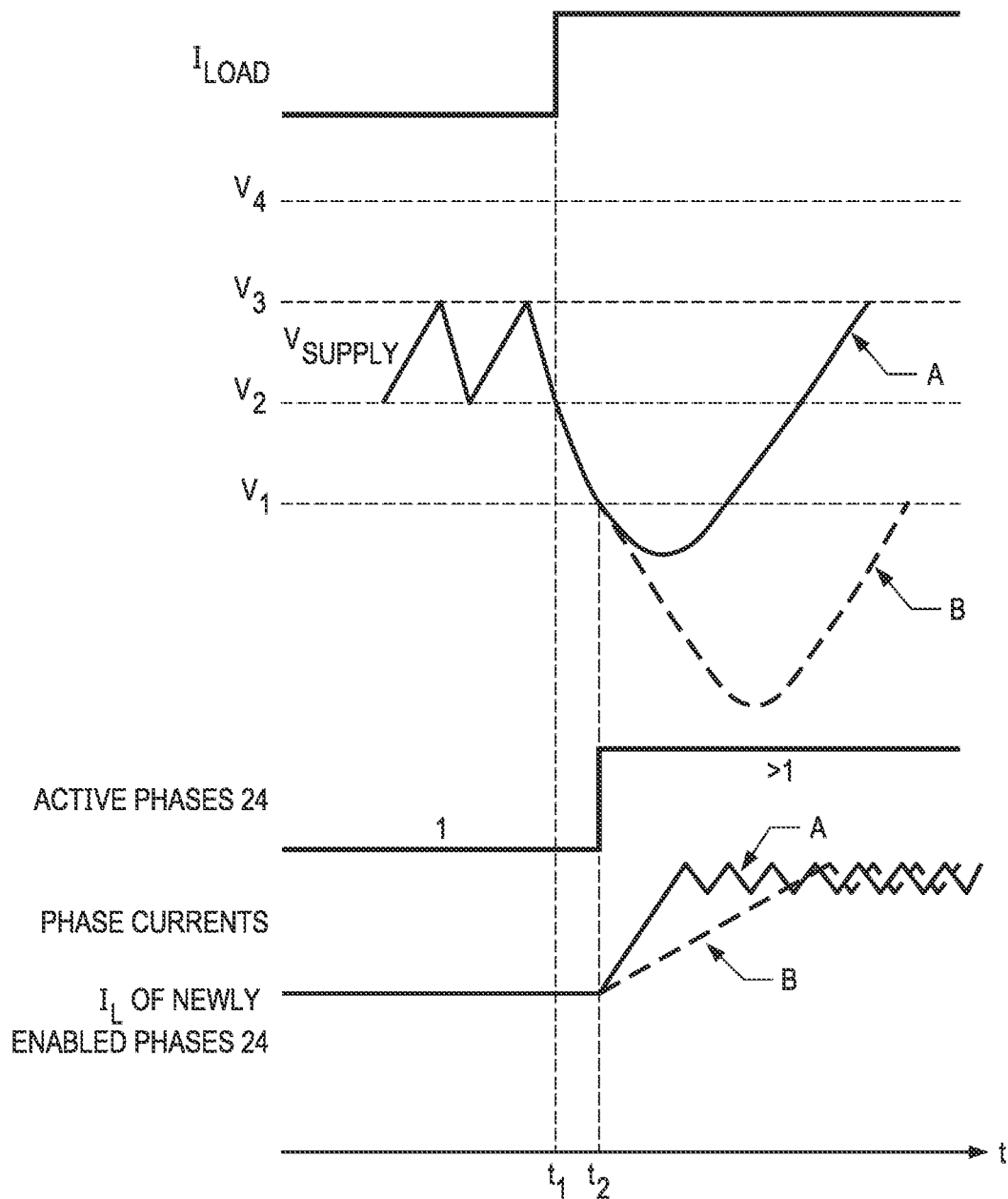
FIG. 22 illustrates a graph of various example waveforms for a load current delivered from a boost converter, a supply voltage generated by the boost converter, and inductor currents for phases of the boost converter, in accordance with embodiments of the present disclosure.

The foregoing description may provide suitable regulation of supply voltage $V_{SUPPLY}$ in many instances. However, in the event of a large increase in load current LOAD drawn from boost converter 20, supply voltage $V_{SUPPLY}$ may droop excessively below threshold voltage $V_1$, as shown in FIG. 22. FIG. 22 illustrates a large step change in load current $I_{LOAD}$ at a time $t_1$. At a later time $t_2$, supply voltage $V_{SUPPLY}$ may fall below threshold voltage $V_1$, which may cause control circuit 40 to enable additional phases 24 of boost converter 20 (e.g., increase the number of enabled phases 24 from one to more than one). When such additional phases 24 are enabled, they may begin in their individual charging states. In the charging state, inductor currents $I_L$ of the newly-enabled phases 24 may increase, but no current may be transferred from such phases to load current $I_{LOAD}$ during the charging state, so supply voltage $V_{SUPPLY}$ may decrease. Each newly-enabled phase 24 may remain in its charging state until their inductor currents $I_L$ reach target peak current $I_{pk}$. Thus, the longer each newly-enabled phase 24 takes to reach target peak current $I_{pk}$, the more supply voltage $V_{SUPPLY}$ may droop. The rate of current increase for inductor currents $I_L$ may be given by:

$$\frac{dI_L}{dt} = \frac{\text{VDD\_SENSE}}{L}$$

where L is the inductance of a power inductor 32. Notably, due to internal impedances of battery 22, resistance of sense resistor 28, and parasitic impedances of electrical traces between battery 22 and boost converter 20, sense voltage VDD_SENSE may decrease from battery voltage $V_{BAT}$ as battery current $I_{BAT}$ increases, in accordance with Ohm's law.

FIG. 22 illustrates supply voltage $V_{SUPPLY}$ and inductor currents $I_L$ of newly-enabled phases 24 under two scenarios: (i) a scenario labeled by label "A" on waveforms wherein sense voltage VDD_SENSE is relatively high; and (ii) a scenario labeled by label "B" on waveforms wherein sense voltage VDD_SENSE is relatively low. In scenario A, the time of the charging state of the newly-enabled phases 24 may be short due to the higher sense voltage VDD_SENSE, while in scenario B, the time of the charging state of the newly-enabled phases 24 may be longer due to the lower sense voltage VDD_SENSE.

Figure 23:
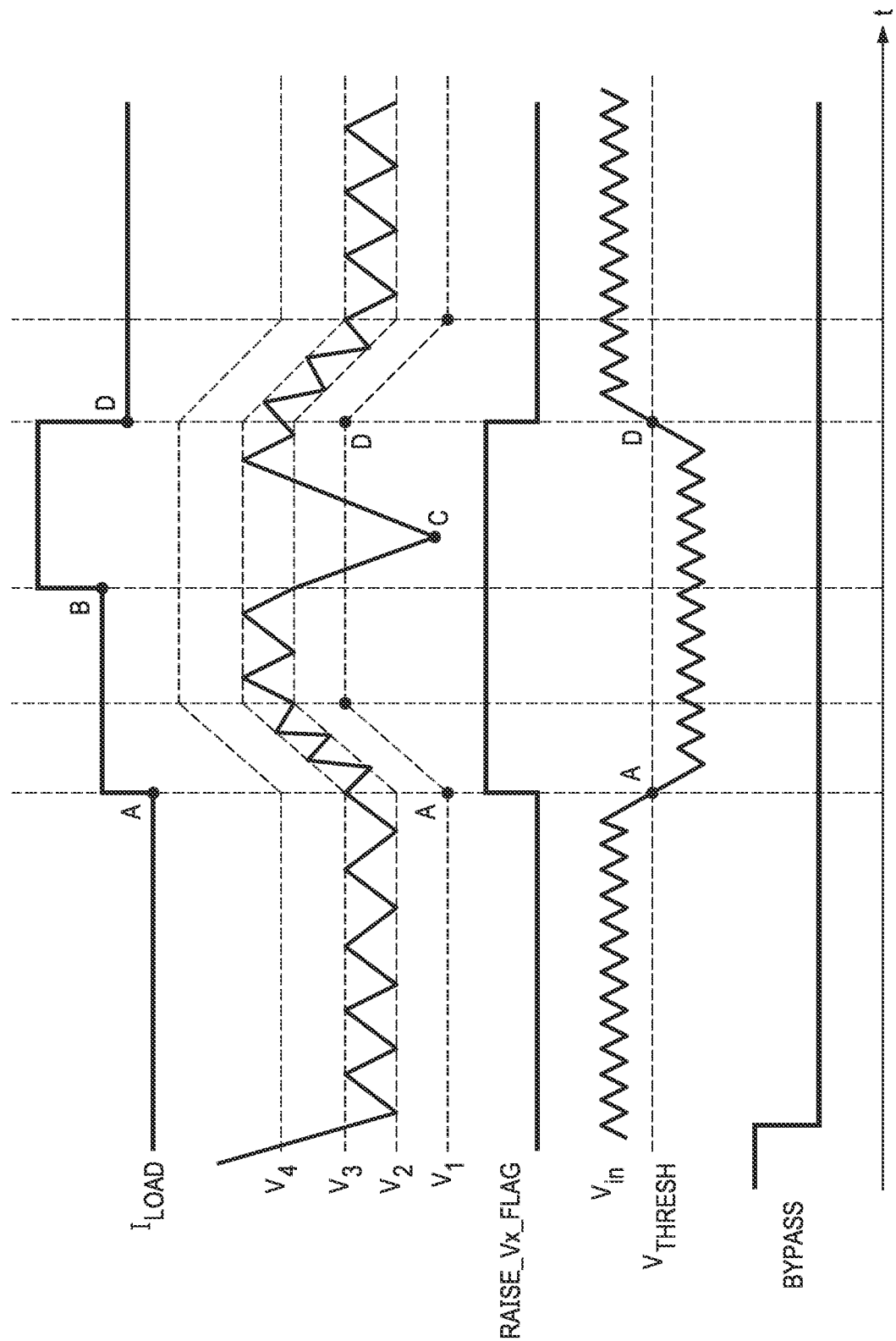
FIG. 23 illustrates a graph of various example waveforms for a load current delivered from a boost converter, threshold voltages for regulating a supply voltage generated by the boost converter, the supply voltage, and a sensed voltage at the input of the boost converter, in accordance with embodiments of the present disclosure.

To overcome this problem, control circuit 40 or another component of boost converter 20 or power delivery system 1 may selectively increase voltage thresholds $V_1$, $V_2$, $V_3$, and $V_4$ when sense voltage VDD_SENSE is deemed to be sufficiently low (e.g., below a threshold sense voltage $V_{THRESH}$), as shown in FIG. 23. As shown in FIG. 23, in response to sense voltage VDD_SENSE decreasing below threshold sense voltage $V_{THRESH}$, control circuit 40 may cause voltage thresholds $V_1$, $V_2$, $V_3$, and $V_4$ to increase by the same amount (e.g., in a controlled, ramped manner as shown in FIG. 23), as shown at point A in FIG. 23. Accordingly, if a large step in load current $I_{LOAD}$ occurs at point B shown in FIG. 23 while sense voltage VDD_SENSE is low, supply voltage $V_{SUPPLY}$ my droop, but because voltage thresholds $V_1$ and $V_2$ have been raised, such droop may be minimal, to point C shown in FIG. 23. When and if sense voltage VDD_SENSE again increases above threshold sense voltage $V_{THRESH}$ (at point D shown in FIG. 23) or if boost converter 20 enters its bypass mode, control circuit 40 may cause voltage thresholds $V_1$, $V_2$, $V_3$, and $V_4$ to decrease to their original levels (e.g., in a controlled, ramped manner as shown in FIG. 23). A Boolean flag RAISE_$V_x$_FLAG is shown in FIG. 23, which may indicate a state of voltage thresholds $V_1$, $V_2$, $V_3$, and $V_4$ (e.g., RAISE_$V_x$_FLAG=0 in default state, RAISE_$V_x$_FLAG=1 when voltage thresholds $V_1$, $V_2$, $V_3$, and $V_4$ are increased).

Using the technique illustrated in FIG. 23, an absolute droop of supply voltage $V_{SUPPLY}$ may be minimized, but the amount of time boost converter 20 spends in its bypass mode is not impacted, thereby preserving efficiency.

Figure 24:
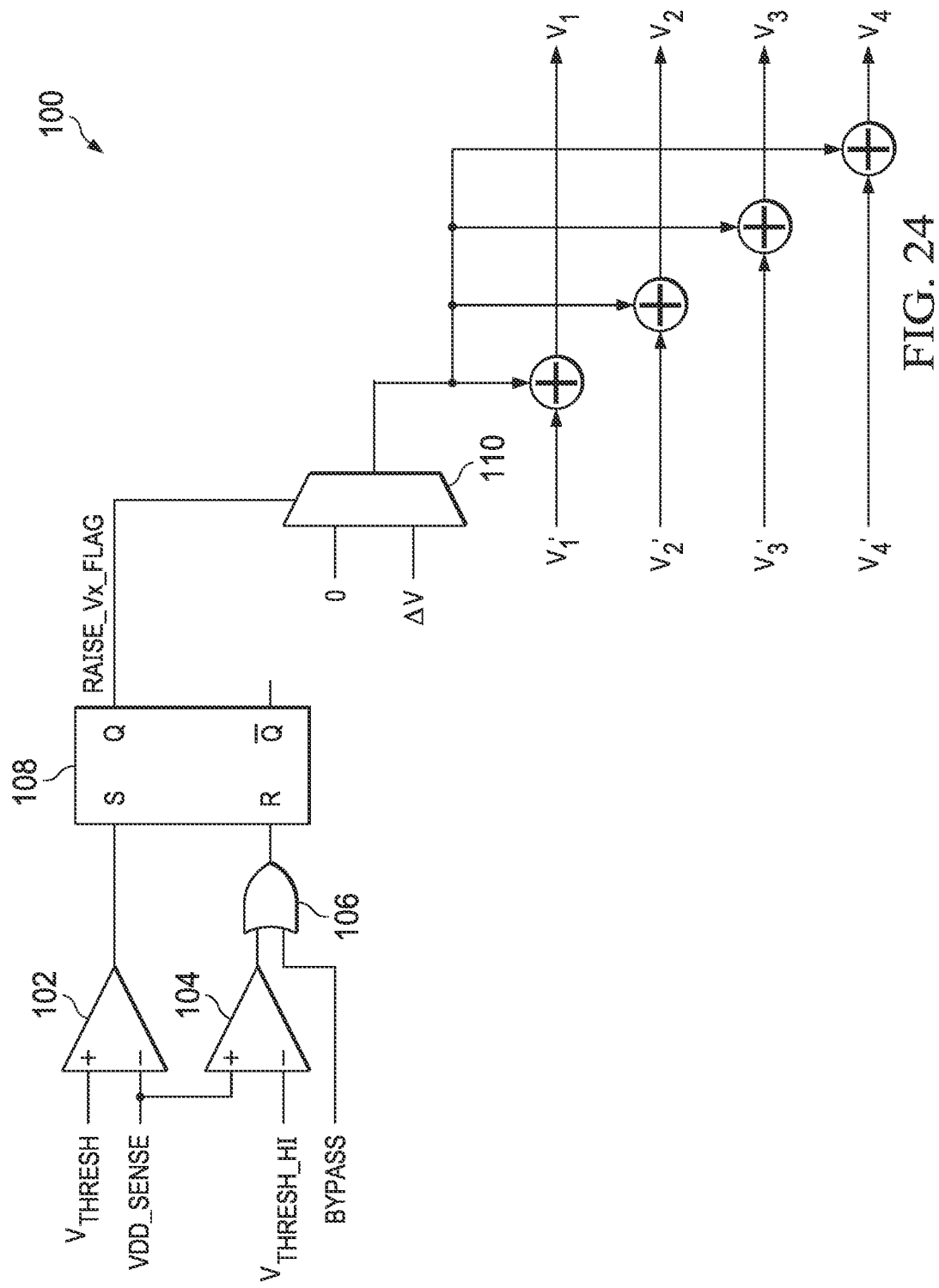
FIG. 24 illustrates selected components of a control subsystem providing for voltage-domain hysteretic control of threshold voltages for regulating a supply voltage generated by the boost converter, in accordance with embodiments of the present disclosure.
Figure 25:
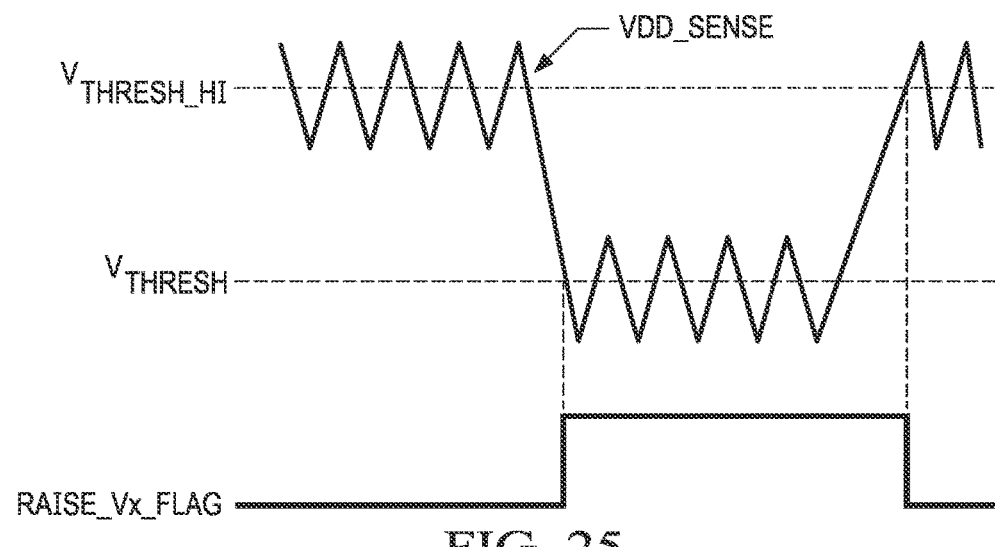
FIG. 25 illustrates a graph of various example waveforms for a sensed voltage at an input of a boost converter and a flag for toggling threshold voltages for regulating a supply voltage generated by the boost converter, in accordance with embodiments of the present disclosure.

To prevent frequent toggling of voltage thresholds $V_1$, $V_2$, $V_3$, and $V_4$ in response to a sense voltage VDD_SENSE near threshold sense voltage $V_{THRESH}$, control circuit 40 may include hysteretic control to perform the technique illustrated in FIG. 23. For example, FIG. 24 illustrates selected components of a control subsystem 100 (e.g., which may be implemented in whole or part by control circuit 40) providing for voltage-domain hysteretic control of threshold voltages $V_1$, $V_2$, $V_3$, and $V_4$, in accordance with embodiments of the present disclosure. As shown in FIG. 24, a comparator 102 may compare sense voltage VDD_SENSE to threshold sense voltage $V_{THRESH}$ and the result of such comparison may be received by set input of set-reset latch 108, causing flag RAISE_$V_x$_FLAG to be asserted when sense voltage VDD_SENSE decreases below threshold sense voltage $V_{THRESH}$, as shown in FIG. 25. Further, a comparator 104 may compare sense voltage VDD_SENSE to higher threshold sense voltage $V_{THRESH-HI}$ and the result of such comparison may be logically OR'ed by OR gate 106 with an indication of whether boost converter 20 is in its bypass mode. The output of OR gate 106 may be received by reset input of set-reset latch 108, causing flag RAISE_$V_x$_FLAG to be deserted when sense voltage VDD_SENSE increases below higher threshold sense voltage $V_{THRESH-HI}$, or if boost converter 20 enters its bypass mode, as shown in FIG. 25. In turn, flag RAISE_$V_x$_FLAG may be received by a select input of a multiplexer 110, which may select an amount (e.g., 0 or $\Delta V$) to add to each of threshold voltages $V_1$, $V_2$, $V_3$, and $V_4$ based on the value of flag RAISE_$V_x$_FLAG. Accordingly, when sense voltage VDD_SENSE increases above higher threshold sense voltage $V_{THRESH-HI}$, threshold voltages $V_1$, $V_2$, $V_3$, and $V_4$ may be decreased to their default values $V_1'$, $V_2'$, $V_3'$, and $V_4'$, and when sense voltage VDD_SENSE decreases below threshold sense voltage $V_{THRESH}$, threshold voltages $V_1$, $V_2$, $V_3$, and $V_4$ may be increased to $V_1'+\Delta V$, $V_2'+\Delta V$, $V_3'+\Delta V$, and $V_4'+\Delta V$, respectively.

For purposes of clarity and exposition, components (e.g., filters, ramp generators, etc.) for causing ramping of threshold voltages $V_1$, $V_2$, $V_3$, and $V_4$ (e.g., as shown in FIG. 23) are not depicted in FIG. 24, but may nonetheless be present in control subsystem 100.

Figure 27:
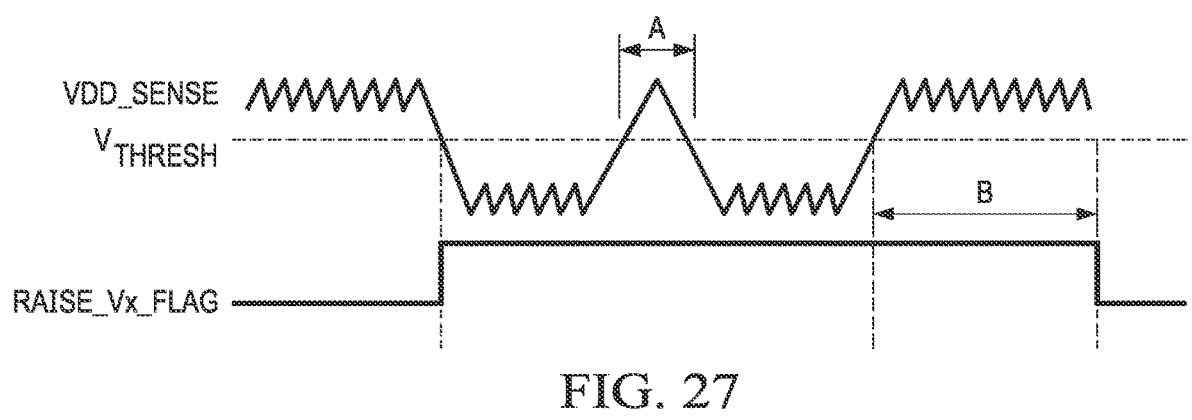
FIG. 27 illustrates a graph of various example waveforms for a sensed voltage at an input of a boost converter and a flag for toggling threshold voltages for regulating a supply voltage generated by the boost converter, in accordance with embodiments of the present disclosure.
Figure 26:
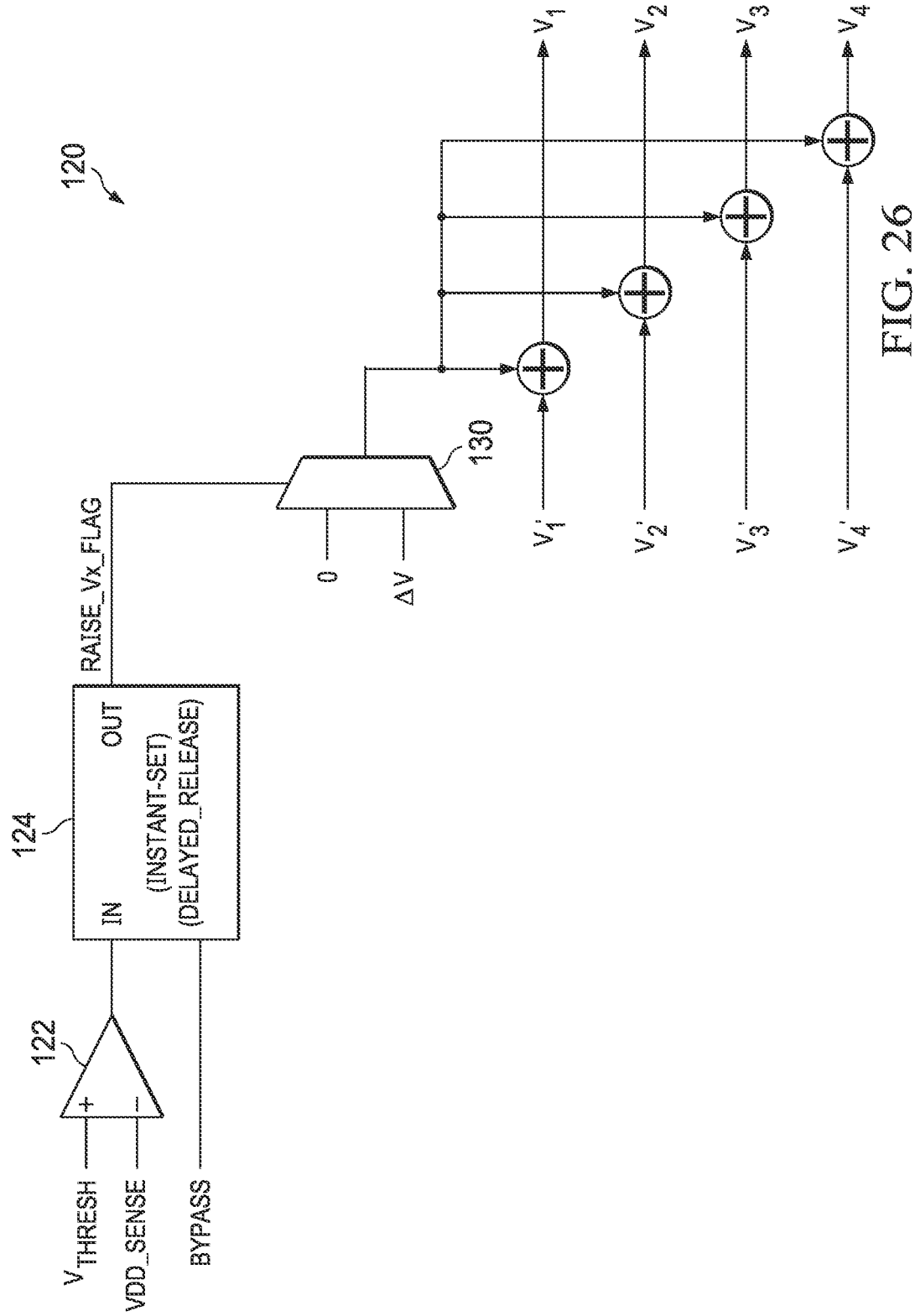
FIG. 26 illustrates selected components of a control subsystem providing for time-domain hysteretic control of threshold voltages for regulating a supply voltage generated by the boost converter, in accordance with embodiments of the present disclosure.

As another example, FIG. 26 illustrates selected components of a control subsystem 120 (e.g., which may be implemented in whole or part by control circuit 40) providing for time-domain hysteretic control of threshold voltages $V_1$, $V_2$, $V_3$, and $V_4$, in accordance with embodiments of the present disclosure. As shown in FIG. 26, a comparator 122 may compare sense voltage VDD_SENSE to threshold sense voltage $V_{THRESH}$ and the result of such comparison may be received by an input of an instant-set, delayed-release timer 124, causing flag RAISE_$V_x$_FLAG to be asserted when sense voltage VDD_SENSE decreases below threshold sense voltage $V_{THRESH}$, as shown in FIG. 27. Timer 124 may then hold flag RAISE_$V_x$_FLAG to be asserted until sense voltage VDD_SENSE increases above threshold sense voltage $V_{THRESH}$ for a programmed minimum duration of time. For example, period A shown in FIG. 27 may be shorter than the programmed minimum duration of time, so the increase of sense voltage VDD_SENSE above threshold sense voltage $V_{THRESH}$ for period A may be insufficient for timer 124 to deassert flag RAISE_$V_x$_FLAG. However, period B shown in FIG. 27 may be equal to the programmed minimum duration of time, so the increase of sense voltage VDD_SENSE above threshold sense voltage $V_{THRESH}$ for period B may be sufficient for timer 124 to deassert flag RAISE_$V_x$_FLAG. Further, should boost converter 20 enter its bypass mode, timer 124 may reset and cause deassertion of flag RAISE_$V_x$_FLAG. In turn, flag RAISE_$V_x$_FLAG may be received by a select input of a multiplexer 130, which may select an amount (e.g., 0 or $\Delta V$) to add to each of threshold voltages $V_1$, $V_2$, $V_3$, and $V_4$ based on the value of flag RAISE_$V_x$_FLAG. Accordingly, when sense voltage VDD_SENSE decreases below threshold sense voltage $V_{THRESH}$, threshold voltages $V_1$, $V_2$, $V_3$, and $V_4$ may be increased to $V_1'+\Delta V$, $V_2'+\Delta V$, $V_3'+\Delta V$, and $V_4'+\Delta V$, respectively, decreasing to default values $V_1'$, $V_2'$, $V_3'$ and $V_4'$ in response to boost converter 20 entering its bypass mode or in response to sense voltage VDD_SENSE increasing above threshold sense voltage $V_{THRESH}$ for the programmed minimum duration of time.

For purposes of clarity and exposition, components (e.g., filters, ramp generators, etc.) for causing ramping of threshold voltages $V_1$, $V_2$, $V_3$, and $V_4$ (e.g., as shown in FIG. 23) are not depicted in FIG. 26, but may nonetheless be present in control subsystem 120.

Figure 28:
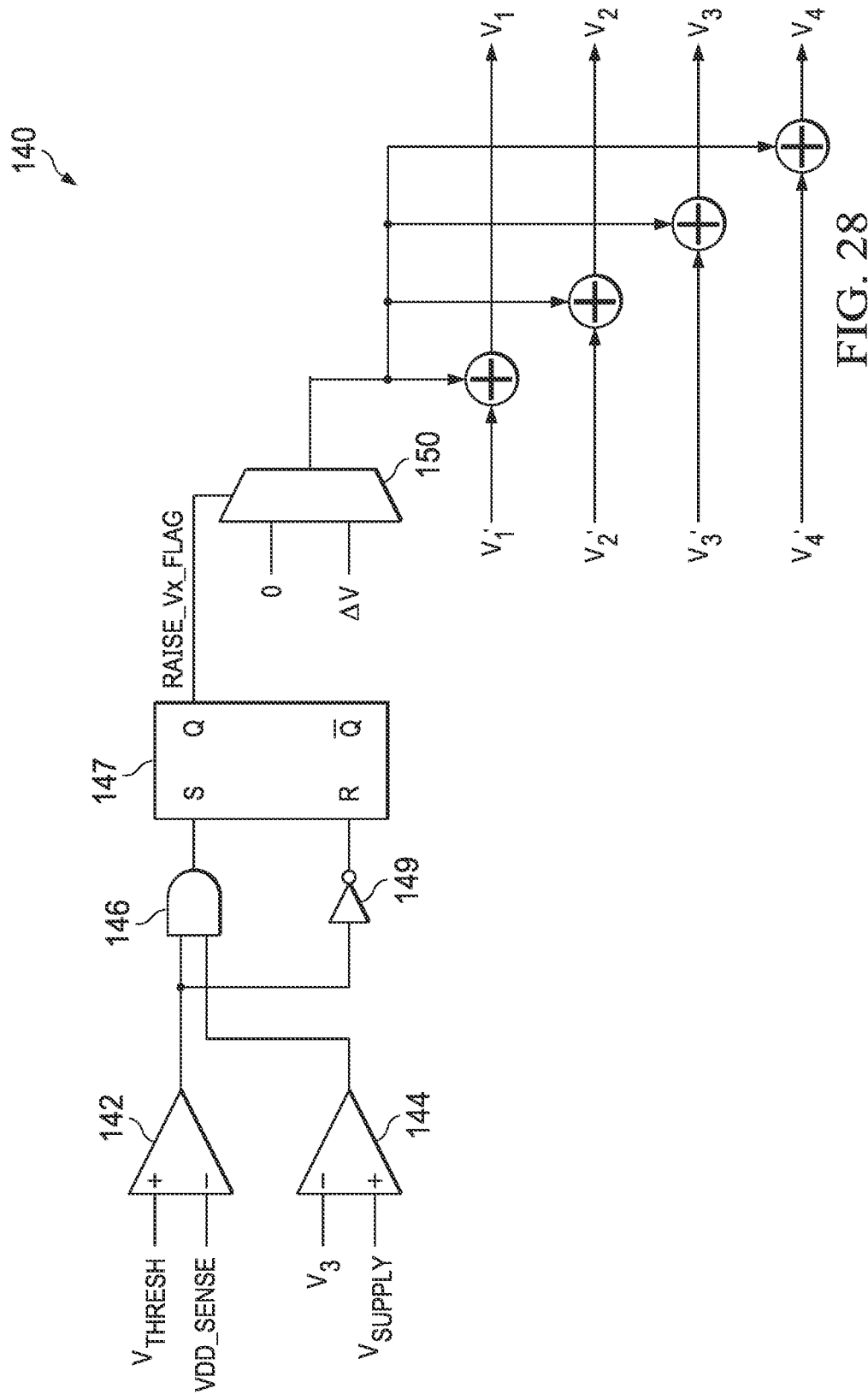
FIG. 28 illustrates selected components of a control subsystem providing for control of threshold voltages for regulating a supply voltage generated by the boost converter, in accordance with embodiments of the present disclosure.
Figure 29:
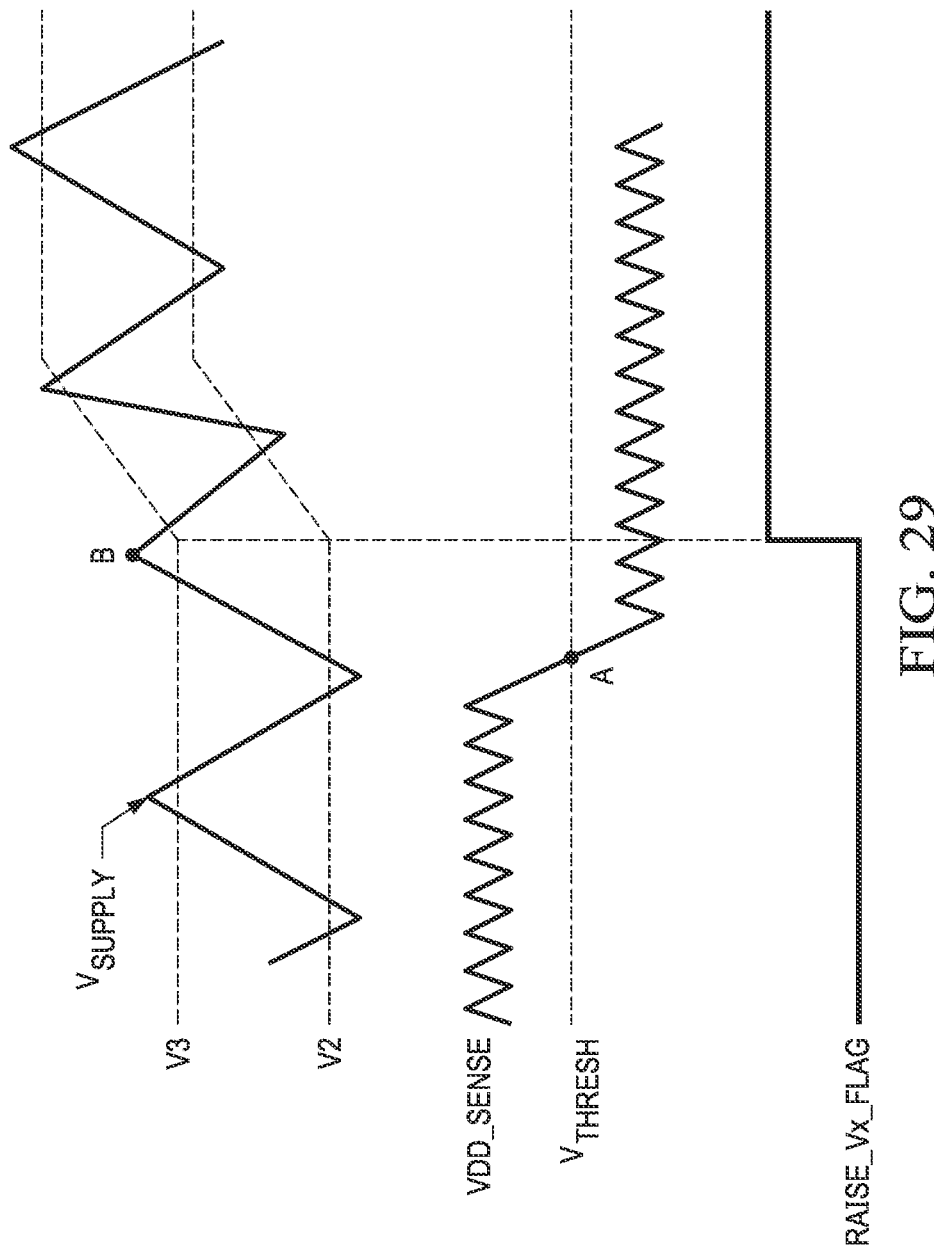
FIG. 29 illustrates a graph of various example waveforms for a sensed voltage at an input of a boost converter, a flag for toggling threshold voltages for regulating a supply voltage generated by the boost converter, and the supply voltage, in accordance with embodiments of the present disclosure.

As another example, FIG. 28 illustrates selected components of a control subsystem 140 (e.g., which may be implemented in whole or part by control circuit 40) providing for control of threshold voltages $V_1$, $V_2$, $V_3$, and $V_4$, in accordance with embodiments of the present disclosure. As shown in FIG. 28, a comparator 142 may compare sense voltage VDD_SENSE to threshold sense voltage $V_{THRESH}$ and the result of such comparison may be received by a first input of a logical AND gate 146. In addition, a comparator 144 may compare supply voltage $V_{SUPPLY}$ to threshold voltage $V_3$ and the result of such comparison may be received by a second input of logical AND gate 146. Accordingly, logical AND gate 146 may trigger the set input of a set-reset latch 147 such that set-reset latch 147 asserts flag RAISE_$V_x$_FLAG when VDD_SENSE<$V_{THRESH}$ and $V_{SUPPLY}$>$V_3$, as shown in FIG. 29. In addition, the output of comparator 142 may be inverted by logical inverter 149 and trigger the reset input of set-reset latch 147 such that flag RAISE_$V_x$_FLAG is deasserted when VDD_SENSE>$V_{THRESH}$.

In turn, flag RAISE_$V_x$_FLAG may be received by a select input of a multiplexer 150, which may select an amount (e.g., 0 or $\Delta V$) to add to each of threshold voltages $V_1$, $V_2$, $V_3$, and $V_4$ based on the value of flag RAISE_$V_x$_FLAG. Accordingly, when VDD_SENSE<$V_{THRESH}$ and $V_{SUPPLY}$>$V_3$, threshold voltages $V_1$, $V_2$, $V_3$, and $V_4$ may be increased to $V_1'+\Delta V$, $V_2'+\Delta V$, $V_3'+\Delta V$, and $V_4'+\Delta V$, respectively, and may be decreased to their default values $V_1'$, $V_2'$, $V_3'$ and $V_4'$ otherwise.

The advantage of waiting is that it may minimize a risk of supply voltage $V_{SUPPLY}$ drooping below threshold voltages $V_1$ and $V_2$ as threshold voltages $V_1$, $V_2$, $V_3$, and $V_4$ are increased. To illustrate, if supply voltage $V_{SUPPLY}$ is below threshold voltage $V_2$, control circuit 40 may rapidly increase load current $I_{LOAD}$ delivered by boost converter 20. Further, if supply voltage $V_{SUPPLY}$ is below threshold voltage $V_1$, control circuit 40 may set load current $I_{LOAD}$ to its maximum. Either of these events may cause undesirable disturbances and spikes on battery current $I_{BAT}$. However, the control implemented by control subsystem 140 may reduce or eliminate such disadvantages.

For purposes of clarity and exposition, components (e.g., filters, ramp generators, etc.) for causing ramping of threshold voltages $V_1$, $V_2$, $V_3$, and $V_4$ (e.g., as shown in FIG. 23) are not depicted in FIG. 28, but may nonetheless be present in control subsystem 140.

In some embodiments, control circuit 40 may implement one of control subsystem 100, control subsystem 120, and control subsystem 140 to control threshold voltages $V_1$, $V_2$, $V_3$, and $V_4$. In other embodiments, control circuit 40 may combine two or more of control subsystem 100, control subsystem 120, and control subsystem 140 in any suitable combination to control threshold voltages $V_1$, $V_2$, $V_3$, and $V_4$.

Figure 30:
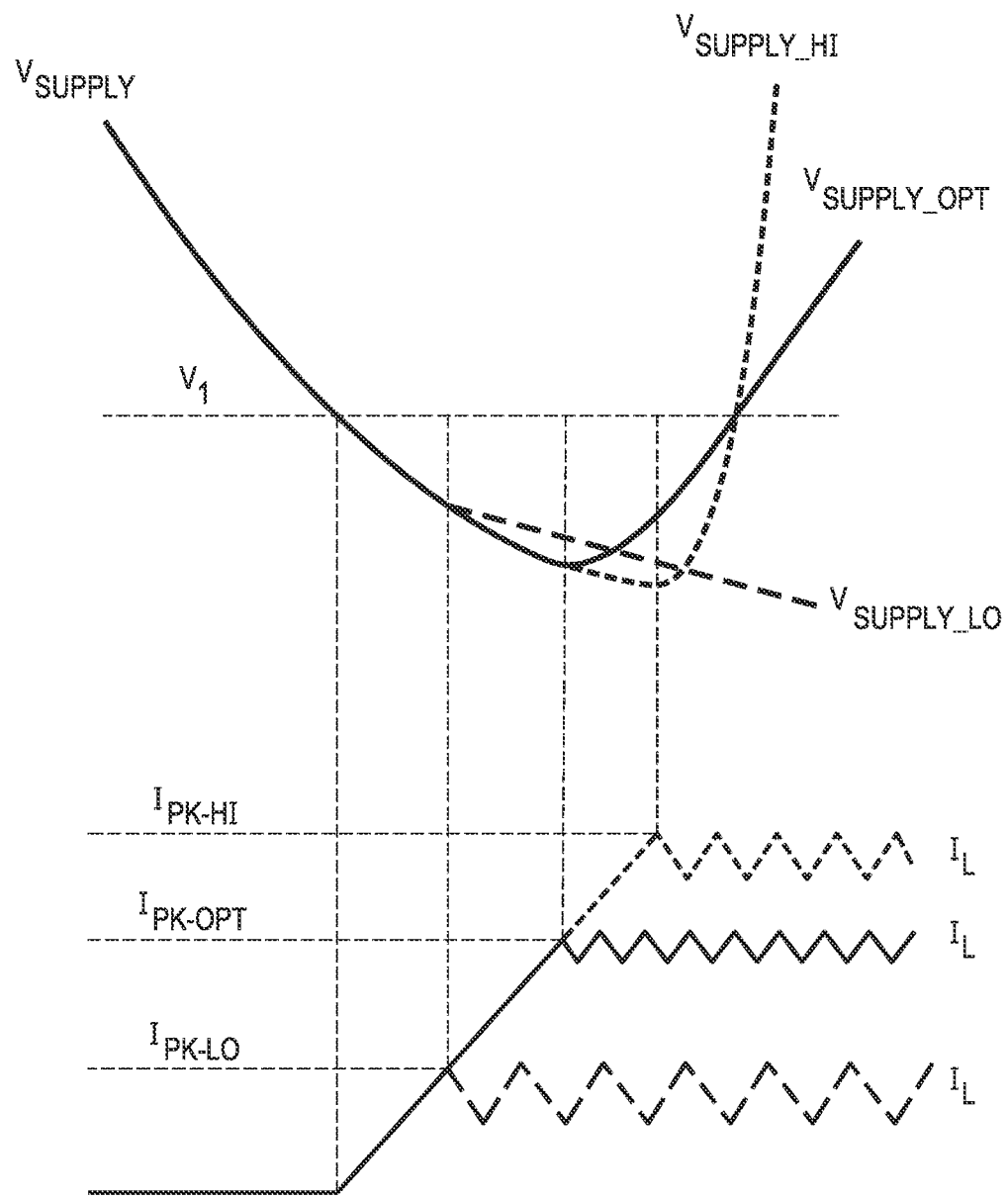
FIG. 30 illustrates a graph of various example waveforms for a supply voltage generated by a boost converter and inductor currents for phases of the boost converter, in accordance with embodiments of the present disclosure.

As noted above, a large increase in load current $I_{LOAD}$ drawn from boost converter 20 may lead to a droop in supply voltage $V_{SUPPLY}$. FIG. 30 illustrates a graph of various example waveforms showing varying degrees of droop for supply voltage $V_{SUPPLY}$ in response to a step in load current $I_{LOAD}$ and also depicts inductor currents $I_L$ for phases 24 of boost converter 20, in accordance with embodiments of the present disclosure. As previously noted, when such a droop occurs, supply voltage $V_{SUPPLY}$ may fall below threshold voltage $V_1$, which may cause control circuit 40 to enable additional phases 24 of boost converter 20 (e.g., increase the number of enabled phases 24 from one to more than one). When such additional phases 24 are enabled, they may begin in their individual charging states. In the charging state, inductor currents $I_L$ of the newly-enabled phases 24 may increase, but no current may be transferred from such phases to load current $I_{LOAD}$ during the charging state, so supply voltage $V_{SUPPLY}$ may decrease. Each newly-enabled phase 24 may remain in its charging state until their inductor currents $I_L$ reach target peak current $I_{pk}$. Thus, the longer each newly-enabled phase 24 takes to reach target peak current $I_{pk}$, the more supply voltage $V_{SUPPLY}$ may droop. As also noted above, the rate of current increase for inductor currents $I_L$ may be given by:

$$\frac{dI_L}{dt} = \frac{\text{VDD\_SENSE}}{L}$$

FIG. 30 depicts three possible scenarios for settings of target peak current $I_{pk}$ for phases 24. In a first case, target peak current $I_{pk}$ may be at a value $I_{pk-lo}$ at which inductor current $I_L$ of a newly-enabled phase 24 reaches target peak current $I_{pk}$ quickly and thus begins supplying current to the load of boost converter 20 quickly. However, target peak current value $I_{pk-lo}$ may be insufficient to overcome the droop in supply voltage $V_{SUPPLY}$, which may have a characteristic shown by waveform $V_{SUPPLY-LO}$.

In a second case, target peak current $I_{pk}$ may be at an optimum value $I_{pk-opt}$, which may represent a minimum value for target peak current $I_{pk}$ sufficient to support the load. In this case, inductor current $I_L$ of newly-enabled phase(s) 24 may reach target peak current $I_{pk}$ quickly and also be sufficient to support the load, allowing supply voltage $V_{SUPPLY}$, which may have a characteristic shown by waveform $V_{SUPPLY-OPT}$, to efficiently overcome the droop.

In a third case, target peak current $I_{pk}$ may be at a value $I_{pk-hi}$ at which inductor current $I_L$ of newly-enabled phase(s) 24 reaches target peak current $I_{pk}$ slowly and thus begins supplying current to the load of boost converter 20 slowly. Thus, while target peak current value $I_{pk-hi}$ may be sufficient to overcome the droop in supply voltage $V_{SUPPLY}$ (which may have a characteristic shown by waveform $V_{SUPPLY-HI}$) over time, an excessive amount of droop may occur up until the time at which time newly-enabled phase(s) 24 begins delivering current.

Accordingly, it may be desirable to use the optimum value $I_{pk-opt}$ which is large enough to support a given maximum load current $I_{LOAD}$, while small enough to minimize the duration of the charging state of newly-added phase(s) 24 and thus minimize the magnitude of droop in supply voltage $V_{SUPPLY}$. However, such optimum value may change over time depending on a state of boost converter 20 and a power delivery system in which boost converter 20 is present. Accordingly, choosing such optimum value $I_{pk-opt}$ may prove challenging.

To generate an optimum value for target peak current $I_{pk}$ (as well as valley peak current $I_{val}$), control circuit 40 (or a component thereof, such as load estimator 44 or current controller 46) may set target average current $I_{avg}$ based on sense voltage VDD_SENSE. To illustrate, given a known maximum power draw $P_{MAX}$ from the output of boost converter 20, an instantaneous target average current $I_{avg-max}$ for power draw $P_{MAX}$ may be given as:

$$I_{avg-max} = \frac{P_{MAX}}{\text{VDD\_SENSE}(t)} \frac{1}{n}$$

where n is an approximation of a power efficiency of boost converter 20. Maximum target peak current $I_{pk-max}$ and maximum target valley current $I_{val-max}$ may be calculated as follows:

$$I_{pk-max} = I_{avg-max} + \frac{I_{ripple}}{2}$$

$$I_{val-max} = I_{avg-max} - \frac{I_{ripple}}{2}$$

Figure 31:
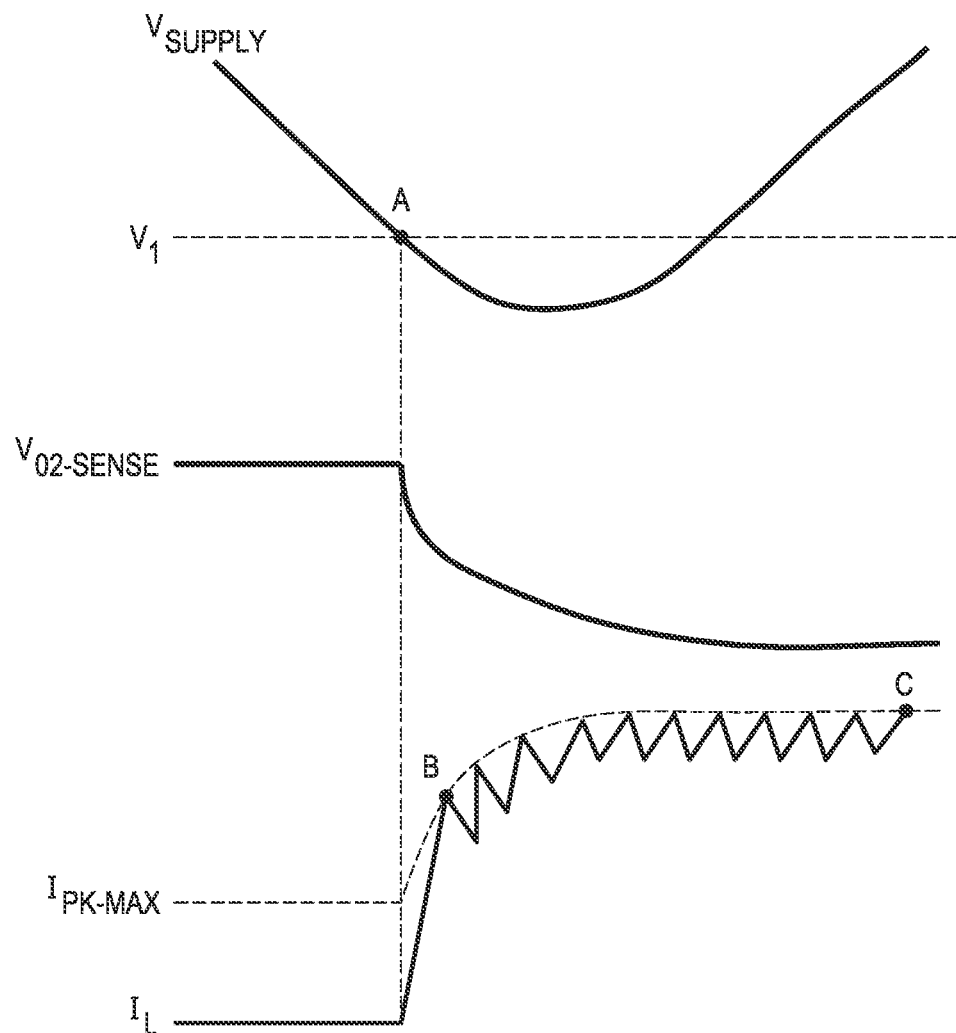
FIG. 31 illustrates a graph of various example waveforms for a supply voltage generated by a boost converter, inductor currents for phases of the boost converter, and a sensed voltage at an input of the boost converter, in accordance with embodiments of the present disclosure.

These values for maximum target peak current $I_p$k-max and maximum valley current $I_{val-max}$ may be used as illustrated in FIGS. 8 and 15 and as described above for calculating target peak current $I_{pk}$ and valley current $I_{val}$. FIG. 31 illustrates a graph of various example waveforms for supply voltage $V_{SUPPLY}$ generated by boost converter 20, inductor currents $I_L$ for newly-enabled phase(s) 24, and sense voltage VDD_SENSE in accordance with embodiments of the present disclosure. In particular, FIG. 31 depicts control by control circuit 40 to vary maximum target peak current $I_{pk-max}$ as a function of sense voltage VDD_SENSE. In FIG. 31, supply voltage $V_{SUPPLY}$ may fall below threshold voltage $V_1$ at point A, which may trigger control circuit 40 to enable one or more additional phases 24. Further, the decrease of supply voltage $V_{SUPPLY}$ to below threshold voltage $V_1$ may cause control circuit 40 to set target peak current $I_{pk}$ to maximum target peak current $I_{pk-max}$ (and set target valley current $I_{val}$ to maximum target valley current $I_{pk-val}$). Further, as sense voltage VDD_SENSE decreases, maximum target peak current $I_{pk-max}$ (and maximum target valley current $I_{pk-val}$) may increase as a function of sense voltage VDD_SENSE. Accordingly, boost converter 20 may take advantage of a lower initial peak current requirement shown at point B in FIG. 31 so that boost converter 20 may begin transferring current to its output sooner, thereby preventing excessive droop on supply voltage $V_{SUPPLY}$. Maximum target peak current $I_{pk-max}$ (and maximum target valley current $I_{pk-val}$) may increase to steady-state levels, shown at point C in FIG. 31.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A mobile electronic device system comprising:
a power converter configured to receive an input voltage from a battery of a mobile device and generate an output voltage; and
a controller configured to:
control operation of the power converter based on a comparison of the output voltage with at least one output voltage threshold; and
set the at least one output voltage threshold based on the input voltage by increasing the at least one output voltage threshold when the input voltage decreases from greater than an input voltage threshold to lesser than the input voltage threshold.

2. The mobile electronic device system of claim 1, wherein the controller comprises a switch controller for controlling switching of the power converter to define a charging state and a transfer state of the power converter, wherein the switch controller is configured to control the switching of the power converter based on the comparison.

3. The mobile electronic device system of claim 1, wherein the controller is configured to:
control operation of the power converter based on a comparison of the output voltage with a plurality of output voltage thresholds; and
set the plurality of output voltage thresholds based on the input voltage.

4. The mobile electronic device system of claim 1, wherein the controller is further configured to increase the at least one output voltage threshold from a first magnitude to a second magnitude greater than the first magnitude when the input voltage decreases from greater than an input voltage threshold to lesser than the input voltage threshold.

5. The mobile electronic device system of claim 4, wherein:
the power converter is configured to operate in a bypass mode in which a bypass switch couples an output of the power converter configured to generate the output voltage to an input of the power converter at which the input voltage is received; and
the controller is configured to set the at least one output voltage threshold to the first magnitude in response to the power controller entering the bypass mode.

6. The mobile electronic device system of claim 1, wherein the controller is further configured to decrease the at least one output voltage threshold when the input voltage increases from lesser than a second input voltage threshold to greater than the second input voltage threshold, further wherein the second input voltage threshold is greater than the first input voltage threshold.

7. The mobile electronic device system of claim 1, wherein the controller is further configured to decrease the at least one output voltage threshold when the input voltage increases from lesser than the input voltage threshold to greater than the input voltage threshold for more than a defined period of time.

8. The mobile electronic device system of claim 1, wherein the controller is further configured to increase the at least one output voltage threshold when:
the input voltage is less than an input voltage threshold; and
the output voltage is greater than a defined output voltage threshold.

9. The mobile electronic device system of claim 8, wherein the defined output voltage threshold comprises one of the least one output voltage threshold.

10. The mobile electronic device system of claim 8, wherein the controller is further configured to decrease the at least one output voltage threshold when the input voltage is greater than the input voltage threshold.

11. A method comprising:
controlling operation of a power converter configured to receive an input voltage from a battery of a mobile device and generate an output voltage, such controlling based on a comparison of the output voltage with at least one output voltage threshold; and setting the at least one output voltage threshold based on the input voltage by increasing the at least one output voltage threshold when the input voltage decreases from greater than an input voltage threshold to lesser than the input voltage threshold.

12. The method of claim 11, further comprising controlling switching of the power converter to define a charging state and a transfer state of the power converter, in order to control the switching of the power converter based on the comparison.

13. The method of claim 11, further comprising:
controlling operation of the power converter based on a comparison of the output voltage with a plurality of output voltage thresholds; and
setting the plurality of output voltage thresholds based on the input voltage.

14. The method of claim 11, further comprising increasing the at least one output voltage threshold from a first magnitude to a second magnitude greater than the first magnitude when the input voltage decreases from greater than an input voltage threshold to lesser than the input voltage threshold.

15. The method of claim 14, wherein:
the power converter is configured to operate in a bypass mode in which a bypass switch couples an output of the power converter configured to generate the output voltage to an input of the power converter at which the input voltage is received; and
the method further comprises setting the at least one output voltage threshold to the first magnitude in response to the power controller entering the bypass mode.

16. The method of claim 11, further comprising decreasing the at least one output voltage threshold when the input voltage increases from lesser than a second input voltage threshold to greater than the second input voltage threshold, further wherein the second input voltage threshold is greater than the first input voltage threshold.

17. The method of claim 11, further comprising decreasing the at least one output voltage threshold when the input voltage increases from lesser than the input voltage threshold to greater than the input voltage threshold for more than a defined period of time.

18. The method of claim 11, further comprising increasing the at least one output voltage threshold when:
the input voltage is less than an input voltage threshold; and
the output voltage is greater than a defined output voltage threshold.

19. The method of claim 18, wherein the defined output voltage threshold comprises one of the at least one output voltage threshold.

20. The method of claim 18, further comprising decreasing the at least one output voltage threshold when the input voltage is greater than the input voltage threshold.

* * * * *